(12) United States Patent
Zhang et al.

(10) Patent No.: US 10,169,665 B1
(45) Date of Patent: Jan. 1, 2019

(54) VIRTUAL INDUCTANCE LOOP

(71) Applicant: Alarm.com Incorporated, Tysons, VA (US)

(72) Inventors: Zhong Zhang, Great Falls, VA (US); Allison Beach, Leesburg, VA (US); Narayanan Ramanathan, Chantilly, VA (US); Don Madden, State College, PA (US)

(73) Assignee: Alarm.com Incorporated, Tysons, VA (US)

( * ) Notice: Subject to any disclaimer, the term of this patent is extended or adjusted under 35 U.S.C. 154(b) by 206 days.

(21) Appl. No.: 15/445,071

(22) Filed: Feb. 28, 2017

Related U.S. Application Data

(60) Provisional application No. 62/300,898, filed on Feb. 28, 2016.

(51) Int. Cl.
*G06K 9/00* (2006.01)
*G06K 9/62* (2006.01)
*G06T 7/80* (2017.01)
*G06T 7/70* (2017.01)
*G06T 7/292* (2017.01)
*G06T 7/11* (2017.01)

(52) U.S. Cl.
CPC ..... *G06K 9/00785* (2013.01); *G06K 9/00771* (2013.01); *G06K 9/6201* (2013.01); *G06T 7/292* (2017.01); *G06T 7/70* (2017.01); *G06T 7/80* (2017.01); *G06K 2209/23* (2013.01); *G06T 7/11* (2017.01)

(58) Field of Classification Search
CPC ............ G06K 9/00785; G06K 9/6201; G06K 9/00771; G06K 2209/23; G06T 7/292; G06T 7/70; G06T 7/80; G06T 7/11
USPC ......................................................... 382/103
See application file for complete search history.

(56) References Cited

U.S. PATENT DOCUMENTS

| 7,801,330 | B2 | 9/2010 | Zhang et al. | |
|---|---|---|---|---|
| 8,825,350 | B1* | 9/2014 | Robinson | G08G 1/0116 701/117 |
| 2007/0127774 | A1 | 6/2007 | Zhang | |
| 2011/0170744 | A1 | 7/2011 | Malinovskiy | |
| 2012/0134532 | A1 | 5/2012 | Ni | |
| 2017/0286778 | A1* | 10/2017 | Madden | G06K 9/00771 |

\* cited by examiner

*Primary Examiner* — Amandeep Saini
(74) *Attorney, Agent, or Firm* — Fish & Richardson P.C.

(57) ABSTRACT

Methods, systems, and apparatus, including computer programs encoded on a computer storage medium, for virtual inductance loop technology. In one aspect, a method includes calibrating, using calibration parameters, cameras directed towards a scene, obtaining, by the cameras, images corresponding to the scene, identifying reference structures in the scene, and determining, based on the reference structures and the images, locations in the scene for generating virtual inductance loop lines in the scene. The method also includes generating the virtual inductance loop lines to be imposed on the images, comparing the virtual inductance loop lines to determine one or more offsets, and determining, based on the offsets, characteristics of the scene.

20 Claims, 21 Drawing Sheets

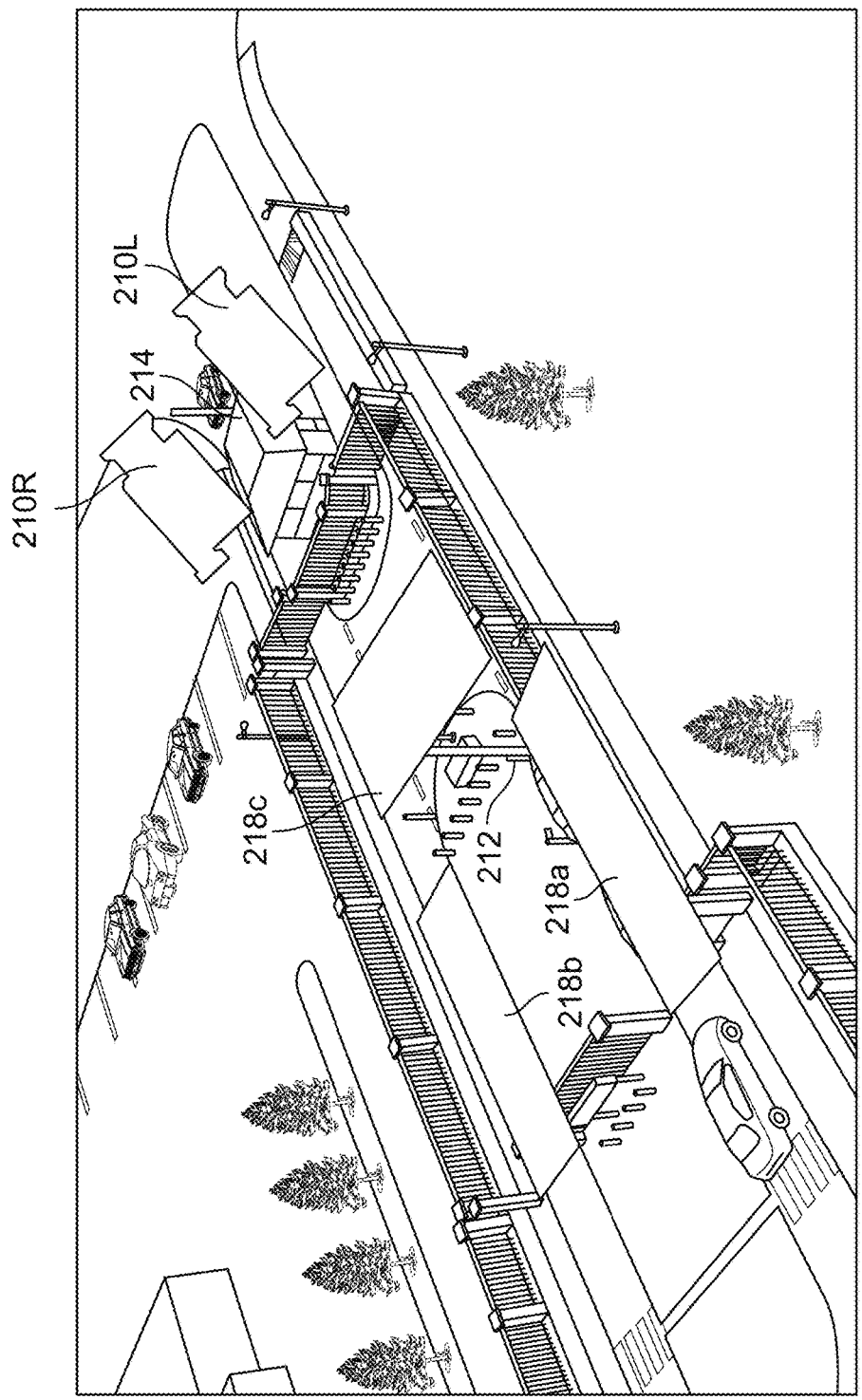

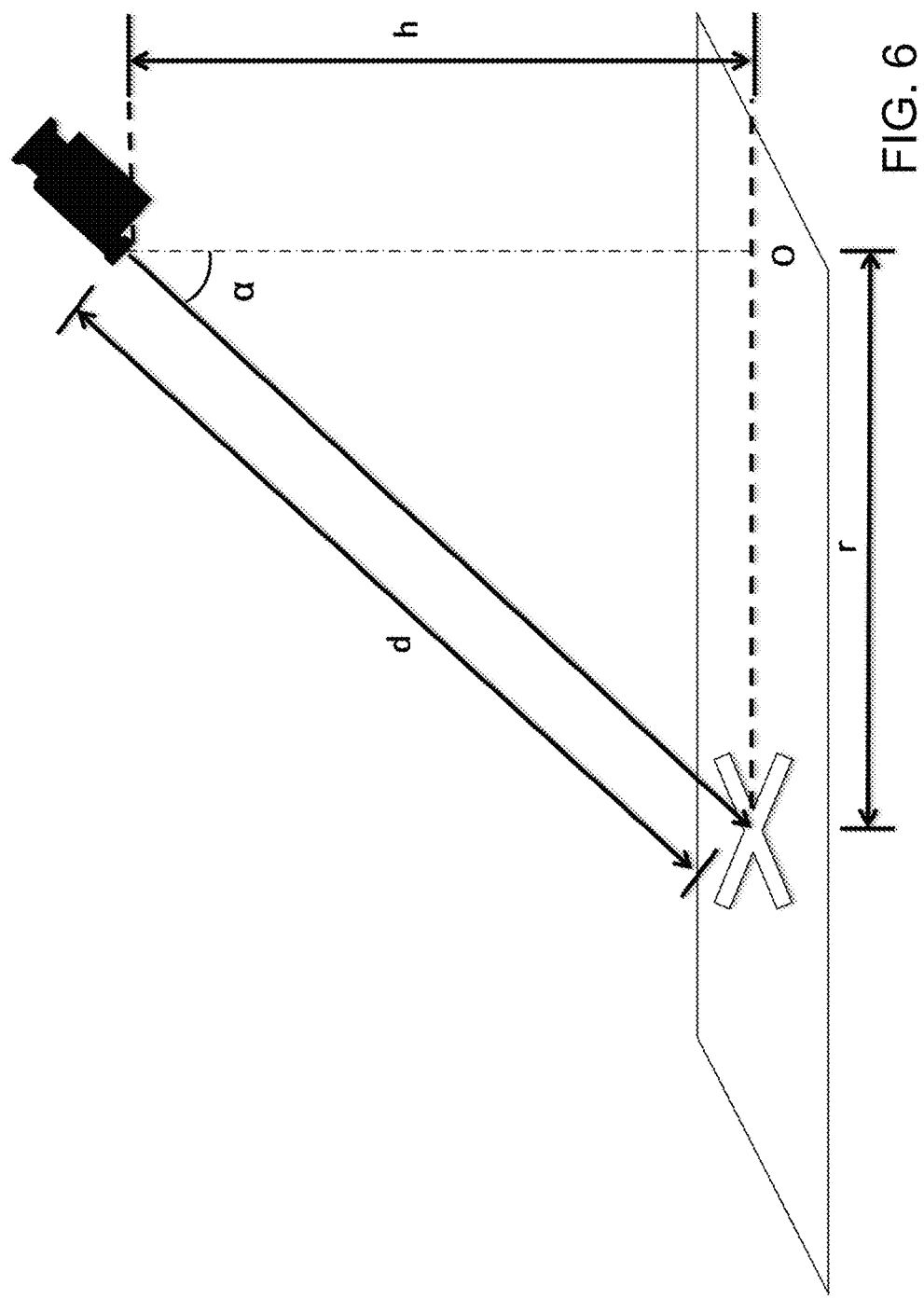

VIRTUAL INDUCTANCE LOOP

CROSS-REFERENCE TO RELATED APPLICATIONS

The application claims the benefit of U.S. Provisional Application No. 62/300,898, filed on Feb. 28, 2016.

BACKGROUND

Detecting the presence of a moving object, such as a person, animal, or vehicle is important for many applications, including home or retail surveillance, security, marketing analysis, traffic analysis, people counting, vehicle counting, wild life tracking, etc. Video surveillance cameras, inductive loops, motion detectors, light curtains, etc. have typically been deployed to monitor for a moving object under a wide variety of settings such as access control points, retail environments, loading docks, driveways, backyards, and places of high security such as airports, train stations, nuclear facilities, army bases, naval bases, air force bases, etc. Each of these technologies have are limited in various aspects. For example, use of an inductance loop is often used to detect the presence of a vehicle at a stop light or at an entrance through a security barrier. However, installation of an inductance loop is typically complicated, requiring burying the inductance loop under a roadway. Further, it can be difficult to set the inductance loop to achieve the correct sensitivity—an insensitive inductance loop may result in a long wait for a vehicle operator, while an overly sensitive inductance loop may trigger false vehicle detections, and can result in unwanted or even dangerous actions responsive thereto. For example, a barrier gate arm at a security barrier may close on a car previously cleared to pass due to detection of a second car in a neighboring lane. Bicycles may be undesirably detected and a barrier gate arm may close on the bicyclist.

Systems other than an inductance loop may also be used to monitor a location. For example, a video camera may be used to detect loitering, left behind objects, count people, etc. Analysis of a single image or video obtained from one camera is useful in many applications, but incurs challenges in other applications. When attempting to detect the presence of a vehicle, ground shadows and spotlights formed by vehicle headlights may be processed as edges during video analysis, which may result in incorrect object detection.

Use of multiple video cameras can address inaccuracies in single camera video analytics, but multiple video camera systems are often computationally expensive. In addition, multi-camera video analytics often require precise and overly complex installation, mistakes in which can lead to poor results. Motion detectors are known to trigger false alarms in outdoor environments due to inclement weather conditions, moving tree branches, and the like. The motion detectors are typically oblivious to the types of objects detected. In another example, light curtains require precise alignment of LED transmitters and receivers. As such, the light curtains are not typically adopted for residential and commercial settings.

SUMMARY

One innovative aspect of the subject matter described in this specification is embodied in methods that include the actions of calibrating, using calibration parameters, cameras directed towards a scene, obtaining, by the cameras, images corresponding to the scene, identifying reference structures in the scene, and determining, based on the reference structures and the images, locations in the scene for generating virtual inductance loop lines in the scene. The method also includes generating the virtual inductance loop lines to be imposed on the images, comparing the virtual inductance loop lines to determine one or more offsets, and determining, based on the offsets, characteristics of the scene.

Other implementations of this and other aspects include corresponding systems, apparatus, and computer program, configured to perform the actions of the methods, encoded on computer storage devices.

Implementations may each optionally include one or more of the following features. For instance, the methods can include establishing a respective ground level plane at the scene and imposing the virtual inductance loop line at the respective ground level plane. The methods can also include synchronizing the images obtained by the cameras. In some examples, the method includes determining a change in light intensity of the VIL lines, a change in color of the VIL lines, a predetermined length of a particular intensity of the VIL lines, or a predetermined length of a particular color along the VIL lines. Further, the method can include determining, based on the characteristics of the scene, that an object has passed over the VIL line in a particular direction, and in response to determining that the object has passed over the VIL line, performing an action. In this instance, performing an action can include triggering a security gate, providing an audio indication of the object passing over the VIL line, or providing a visual indication of the object passing over the VIL line.

In some aspects, the methods include for each image: identifying one or more identifiers at the scene, determining a location for each of the one or more identifiers at the scene, and generating the VIL line at the scene with respect to the locations of the one or more identifiers. The methods can include projecting, for each of the cameras, the VIL line onto an image plane for each of the images corresponding to the scene. Additionally, the methods can include generating one or more cross sectional outlines of an object that correspond to one or more intersections between the object and the VIL lines, and determining, based on the one or more cross sectional outlines, whether the object has passed over the VIL line. In this instance, the methods can include calculating, based on the offsets, a height for each of the one or more characteristics, and generating, based on the calculated heights for the one or more characteristics, the one or more cross sectional outlines of the object. Further, the methods can include determining, using the one or more cross sectional outlines of the object, a size of the object and based on determining the size of the object, identifying the object. Additionally, the methods can include determining, using the one or more cross sectional outlines of the object, one or more of a direction of motion of the object, whether the object is being tailgated, or whether the object is an oversized object.

The methods can include determining a focal length adjustment of the camera based on the one or more locations in the scene. The methods can also include determining a tilt angle adjustment and a roll angle adjustment for the cameras based on the one or more locations in the scene. In some example, the methods include adjusting the calibration parameters using the one or more generated VIL lines, calculating an error value between the calibration parameters and the adjusted calibration parameters, and in response to determining the error value between the calibration parameters and the adjusted calibration parameters, determining new calibration parameters that minimize a new error value between the calibration parameters and the new calibration parameters. In this instance, the methods can include determining bounds for the calibration parameters based on the one or more locations in the scene and adjusting the calibration parameters for the camera using the determined bounds for the calibration parameters.

Further, the methods can include identifying that the one or more reference structures in the scene extend in a direction parallel to a horizontal displacement of the camera. In some aspects, the methods include comparing the one or more references structures in the scene with a predetermined set of reference structures including predetermined shapes and sizes. The methods can also include identifying, based on the one or more VIL lines, one or more characteristics of the scene, and generating, based on the one or more identified characteristics, one or more virtual reference structures corresponding to the scene. In this instance, the methods can include comparing the one or more reference structures to the one or more virtual reference structures and determining, based on the comparing, whether the one or more reference structures match the one or more virtual references structures.

Advantageous implementations can include one or more of the following features. The methods of the generating virtual inductance loop lines may be used to identify objects in a scene. The virtual inductance loop lines may be generated to monitor the scene automatically, without human supervision. For example, the virtual inductance loop lines, may be used to automate the actuation of security gates based on the verification of vehicles passing through a gated location. The virtual inductive loop lines may be used to automate the detection of a human, animal, and/or vehicle at a predetermined location that is overlooked by cameras. As such, if the virtual inductance loop lines are incorporated into a security system, the virtual inductance loop lines may not need to be supervised by a guard on duty. The virtual inductance loop lines may be calibrated so that they are not hindered by ambient lighting, headlights of vehicles, taillights of vehicles, traffic lights, and the like. The method of generating virtual inductance loop lines can include multiple cameras that are used to observe a particular location. The cameras may be used for depth calculations in generating 3D images of the scene. Specifically, the cameras may be used to perform 3D pixel rendering of the virtual inductance loop lines. In this instance, the virtual inductance loop lines may be monitored rather than the entire scene, which can be very intense in processing. As such, the present methods may improve processing efficiency in comparison to generating a 3D image of the entire scene.

The methods can also include features of detecting motion at an access gate. The motion can be determined to be moving in an incorrect direction, or in an unusual way. The sequence in which the virtual inductance loop lines are traversed by an object may impart information on an object's direction of motion. The methods may be used to detect oversized vehicles when the virtual inductance loop lines are being traversed for a certain period of time that is greater than a typical duration that the virtual inductance loop lines are traversed. For example, if the virtual inductance loop lines are determined to be traversed for a period of time greater than a predetermined time threshold, the system may be configured to determine that an oversized vehicle is present or detected. In some aspects, the system can be configured to detect tailgating. Further, the systems can be configured to identify a non-moving 3D object within the virtual inductance lines.

The details of one or more embodiments of the inventions set forth in the accompanying drawings and the description below. Other features and advantages of the invention will become apparent from the description, the drawings, and the claims.

BRIEF DESCRIPTION OF THE DRAWINGS

FIGS. 2A-B are diagrams of example virtual inductance loop systems.

FIG. 6 is a diagram of an example relationship between a camera and a surface region.

Like reference numbers and designations in the various drawings indicate like elements.

DETAILED DESCRIPTION

Figure 1:
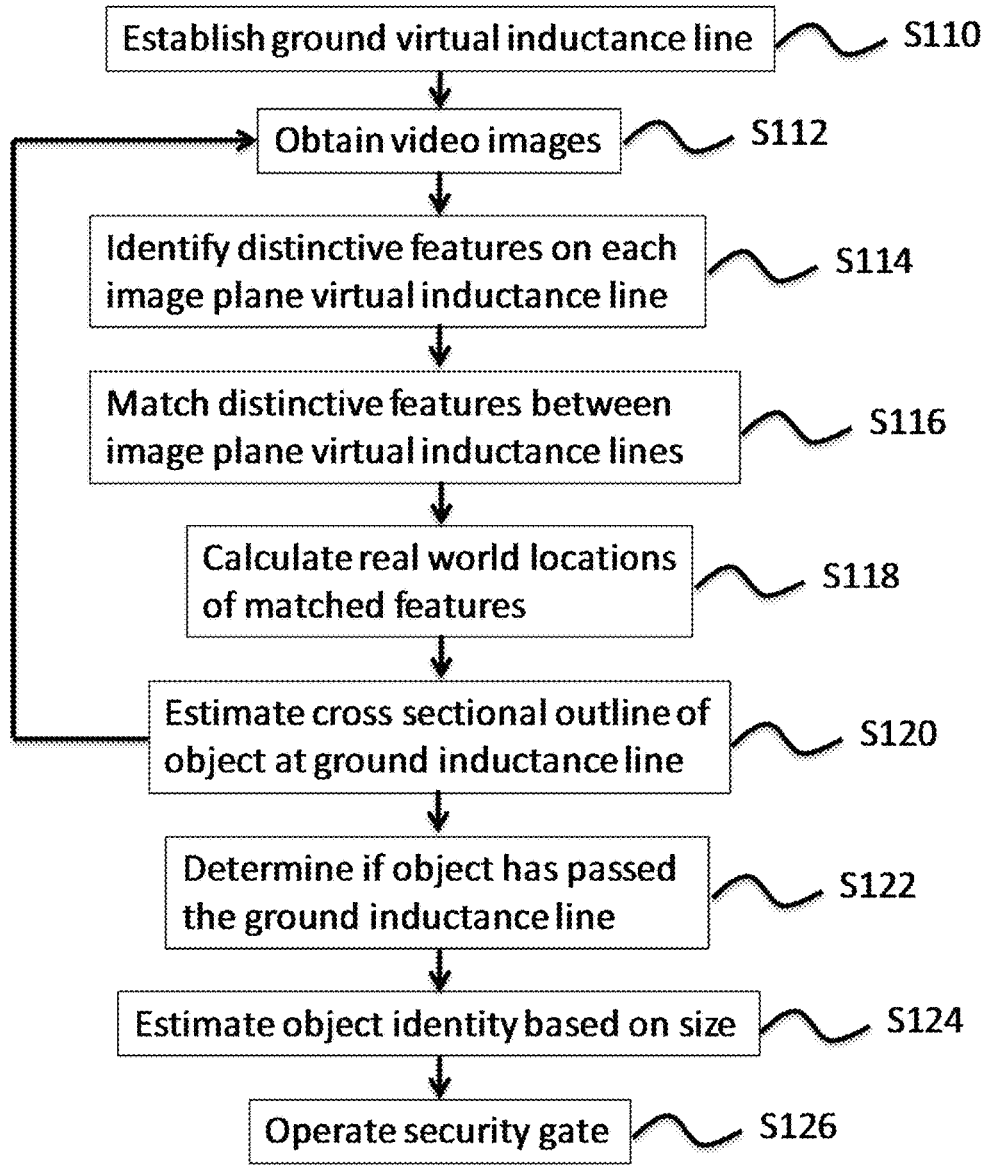
FIG. 1 is a flow chart illustrating an example process for determining whether an object passes a virtual inductance loop line.
Figure 2A:
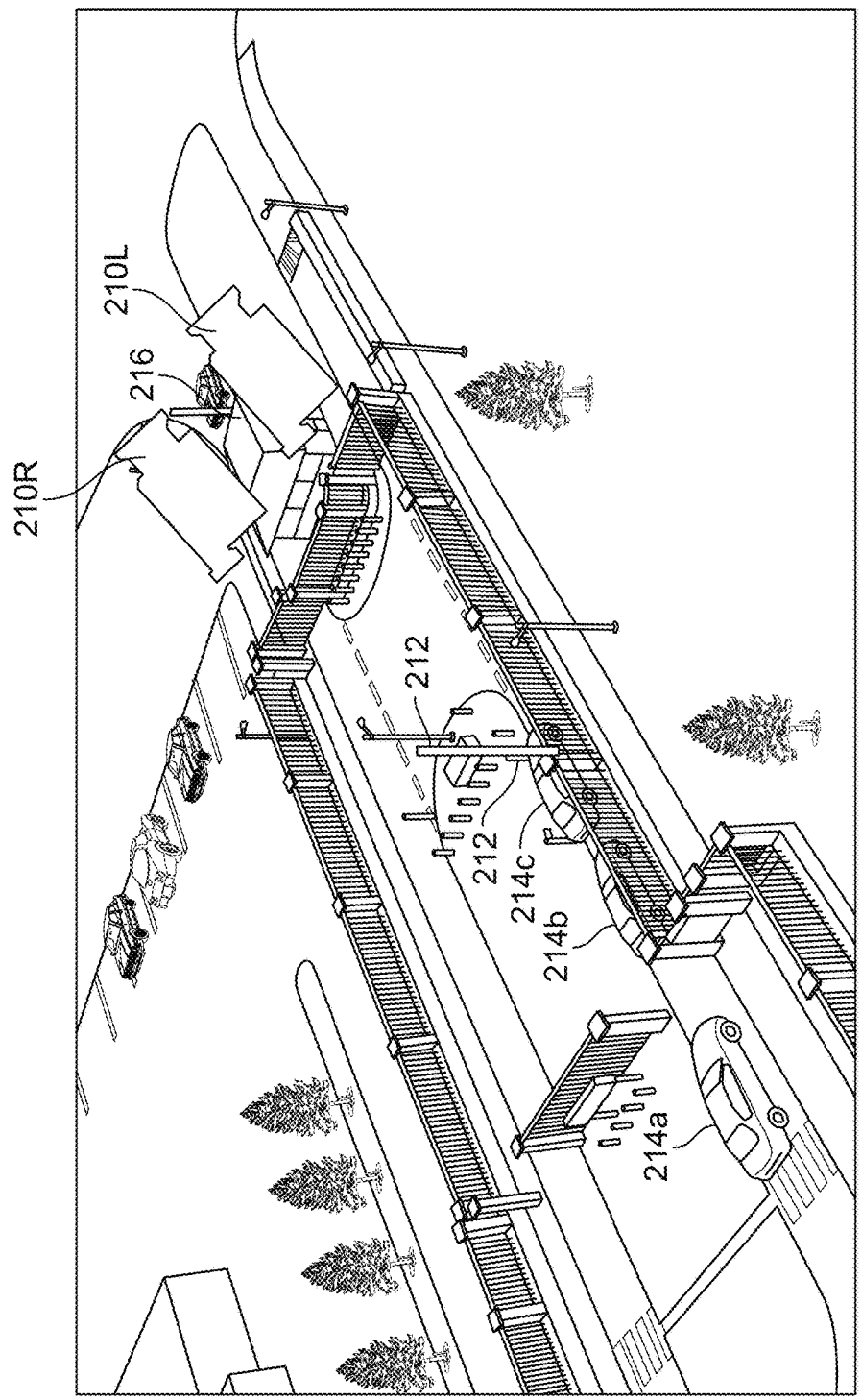

FIG. 1 illustrates an example of a virtual inductance loop method according to an embodiment. As described herein, the virtual inductance loop may be implemented by a single VIL line or a plurality of VIL lines (which may be spaced apart, or may be overlapping). For ease of explanation, the discussion herein will assume use of only two video cameras, but it will be apparent the more than two video cameras may be used. FIGS. 2A and 2B illustrate an example implementation of a surveillance system that may implement the method of FIG. 1. As shown in FIGS. 2A and 2B, two cameras 210L and 210R are positioned to view an automated access control point. The cameras may be mounted on any suitable structure (e.g., light post, side or roof of building, etc.) at a height that allows viewing of the regions (e.g., 218a, 218b and 218c) to be monitored by the virtual inductance loop. In some examples, a pair of cameras may be used to view each of the regions 218a, 218b, and 218c to be monitored by one or more virtual inductance loops. The pair of cameras may be used to view a driveway region, a backyard region, a docking area, a security checkpoint, a retail location, and the like. For example, a first pair of cameras may be mounted to view region 218a at an inbound access point to a security station, a second pair of cameras may be mounted to view region 218b at an outbound access point to the security station, and a third pair of cameras may be mounted to view region 218c at a reject-lane of the security station. A pivoting barrier arm security gate 212 may be lowered to extend across a roadway or raised, to thereby selectively prevent or allow passage of vehicles (214a, 214b, 214c). A security booth 216 may house a computer and user interface of the surveillance system, which may include one or more displays to display one or more of the regions 218a, 218b and 218c to be monitored by the virtual inductance loop, controls to operate the security gate 212 and audio and/or visual alarms to alert security personnel.

In step S110, at least one ground virtual inductance loop line (ground VIL line) may be established to extend between two corresponding fixed points at ground level in the real world. To simplify the immediately following description, reference is made to establishing a single ground VIL line, but the method applies to other ground VIL lines that may be established. The two points in the real world may have been previously identified during calibration of the system. For example, during calibration, markers or identifiers may be placed in the real world that are visible by a left camera and a right camera. The left and right camera may be displaced by a certain amount of distance. For example, the left and right cameras may be separated by a distance such as two to three feet. The left camera 210L and right camera 210R may analyze the scene to identify the markers and provide real world coordinates to the markers. For example, an origin may be determined as a point at ground level equidistant between the left camera and the right camera, or the origin may be determined as a point below one of the cameras 210L and 210R. Locations of a first marker (e.g., $(x_1,y_1,z_1)$) and a second marker (e.g., $(x_2,y_2,z_2)$) relative to the origin may be determined. The real world ground VIL line may be determined as a line extending between the locations of the first and second marker (i.e., between points $(x_1,y_1,z_1)$ and $(x_2,y_2,z_2)$).

The first and second markers may be placed on the ground in the real world and may also be used to establish a ground reference such as a ground plane in the real world (e.g., the origin (having a height of zero by definition) may have a height set at the same level of (or average level of) $z_1$ and $z_{2)}$. In some examples, the first and second markers may be at different heights in the real world, but still set so that the z components representing the vertical location of each of the markers is set to zero for both markers. That is, the plane established as the ground plane by the markers may not be best represent a real world ground plane for the real world viewable by the cameras, but may be at an angle with respect to horizontal direction in the real world (e.g., tilted). Other video analytics performed on the images of the cameras may reference a different real world ground plane. The roll angle of the camera may be calculated with respect to a line extending between the two markers (which lies in the determined real world ground plane) and may not correspond to a direction perpendicular to the force of gravity in the real world, but be instead offset by some angle. In this case, the x direction and y direction of a Cartesian coordinate system may also not correspond to a direction perpendicular to the force of gravity in the real world, but be instead offset by some angle.

It should be emphasized that the ground VIL line need not extend between the determined locations of the first marker and second marker. Rather, the determined real world locations of the first marker and second marker may be used to determine other points between which the ground VIL line should extend (e.g., the ground VIL line may be offset a certain horizontal distance between the locations of the first marker and the second marker, and/or may be rotated a certain angle in the horizontal plane from the line extending between the first marker and second marker. Step S110 may use more than two markers to establish the ground VIL line, exemplary details of which are discussed elsewhere herein.

Figure 3:
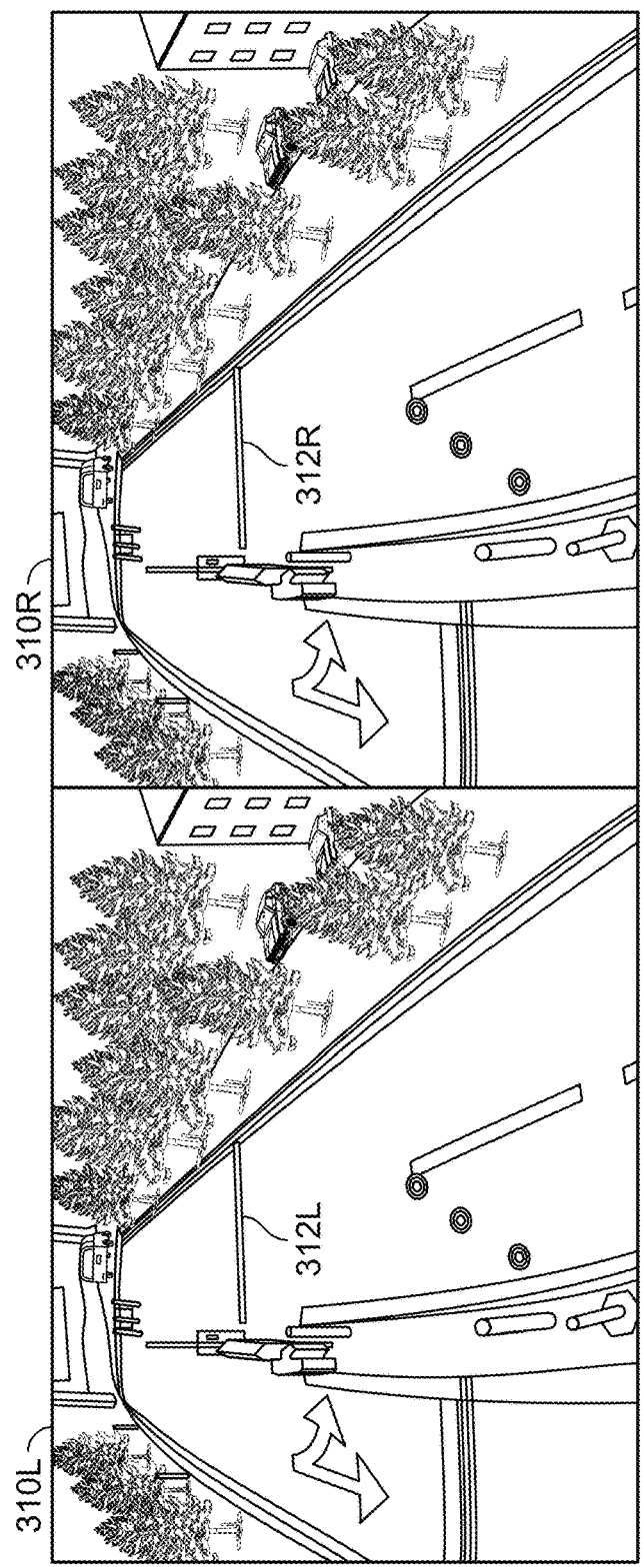
FIG. 3 is a diagram of example images obtained from cameras.

An image plane VIL line (image plane VIL line) may be established in the image plane of each camera (e.g., an image plane VIL line in the image plane of the left camera 210L and an image plane VIL line in the image plane of the right camera 210R). FIG. 3 illustrates exemplary images 310L and 310R that may be respectively obtained from the left camera 210L and the right camera 210R. Image plane VIL lines 312L and 312R, shown to extend across the image planes of the left camera 210L and the right camera 210R, correspond to the ground VIL line at a monitoring region similar to that shown in FIGS. 2A and 2B. Each image plane VIL line may be a line in each of the camera's 2D image plane overlapping the corresponding ground VIL line. For example, each image plane VIL line may be identified as a line extending between two pixels of the corresponding camera's image sensor, the two pixels identifying the location overlapping the two endpoints of the ground VIL line (which may overlap the two markers in the image plane of each camera or be offset and/or rotated some amount, such as a distance and/or rotational angle determined by a user or a distance corresponding to a predetermined distance in the real world). Thus, each of the image plane VIL lines may overlap (with respect to the image plane of the corresponding camera) the ground VIL line. Each image plane VIL line may be the ground VIL line projected onto the image plane of cameras 210R and 210L. In some embodiments, the line to identify an image plane VIL line may have some width, so that it may overlap more than one pixel in its width direction. Calculations (discussed below) along the length of the image plane VIL line (e.g., comparison of pixel values along the length of the image plane VIL line) may be with respect to the average value of pixels along the width of the line rather than value of a single pixel. It should be noted that establishing a ground VIL line may be done simply by establishing the corresponding image plane VIL lines of each of the cameras, and real world definition of the ground VIL (such as by use of real world coordinates) may not be necessary.

In step S112, video images are obtained from two or more video cameras. The video images may be a sequence of still images taken at periodic intervals, which may be from a conventional video camera or still image camera. The images that are analyzed (as discussed below) need not be every image provided (to assist in computational efficiency)—for example, 10 images or less (or 4 images or less) per second may be analyzed, although higher amounts of images per second (e.g., 30 or 60 per second) may be utilized if higher accuracy is desired. The video images obtained from the two or more cameras may be synchronized so that the system may analyze and compare information obtained from frames of the video images that are taken at the same moment in time.

In step S114, distinctive features along the image plane VIL lines of each of the video images are identified. The distinctive features along the image plane VIL lines may be identified by estimating one-dimensional gradients on the VIL lines. For example, the distinctive features along the image plane VIL line may arise as a result of a sudden change in intensity of light, a sudden change in color, identification of a somewhat consistent uninterrupted length of intensity, and/or a somewhat consistent uninterrupted length of the same color.

In step S116, at least some of the identified distinctive features along the image plane VIL line of one camera are matched with at least some of the identified distinctive features along the image plane VIL line of the other video camera.

In step S118, the real world location of each of the matched features is calculated.

In step S120, the height of each of the matched features is calculated to estimate a cross sectional outline that may comprise the height and width of a cross section of any object intersecting the VIL line (e.g., an object that is interposed between the cameras and a line extending between two known points in the real world).

Steps S114 to S120 may be periodically repeated, for example at a regular time interval, such as every $\frac{1}{10}$ (tenth) of a second or every $60^{th}$ of a second. In step S122, the plurality of cross sectional outlines obtained by step S116 are used to estimate when the object has completely passed the ground VIL line. Alternatively, or in addition, the plurality of cross sectional outlines obtained by step S116 are used to estimate when an object has initially obstructed the ground VIL line. For example, movement of the object may be presumed to be in the correct direction of traffic for the road (e.g., the direction associated with a one-way street). After determining the existence of an object obstructing the ground VIL line, detecting the absence of an object may indicate that the initially detected object has fully passed the ground VIL line. Movement of the object using video analytics (identifying an object in a video and tracking movement of the object through time) may also be used to determine location of the object, direction of movement of the object and speed of movement of a detected object, relative to the ground VIL line. For example, the video analytics can be used to identify the direction of the motion of the object using a plurality of VIL lines. In another example, a sequence in which the object traverses across a plurality of VIL lines may be used to identify the object's direction of motion.

In step S124, the object is identified based on the determined size of the object in step S122. The identity of the object may be estimated after it is determined that the object has completely passed over the ground VIL line (to thereby provide a set of cross sectional outlines across the entire length of the object) or may be estimated as the object passes over the ground VIL line. For example, it may be estimated that the object passing over the ground VIL line in step S122 is a vehicle based on determining that a detected size of the object (such as the detected height, height and width and/or 3D size of the object) from the plurality of cross sectional outlines obtained in step S116 is consistent with a known vehicle size (e.g., consistent with a size of a sedan, SUV, pickup truck, convertible, eighteen-wheeler truck, etc.). For example, minimum height and widths of a vehicle may be determined (e.g., a minimum height of 3 feet and a minimum width of 5 feet) and if the detected object has a height taller than the minimum height (e.g., higher than 3 feet) in height and wider than the minimum width (e.g., wider than 5 feet), it may be estimated that the object is a vehicle.

As will be appreciated, such an approach may make not allow for detection of smaller vehicles, such as a motorcycle. Thus, there may be different set of size criteria for detection of a motorcycle or the minimum sizes may be reduced to take into account motorcycles. In some examples, a plurality of sets of sizes (e.g., height and width) criteria may be used to detect different types of vehicles (or other types of objects) where detection of a type of vehicle may cause different actions. For example, detection of standard size cars and trucks may result in closure of the security gate in a normal manner, detection of a motorcycle may cause a slower closure of the security gate at a slower pace and provide a warning alarm (e.g., beeping sound and/or flashing lights) to the motorcycle operator, detection of a pedestrian may simply cause activation of the warning alarm without closure of the security gate, and detection of trucks of certain size or greater may result in sending an alert to (to the security guard manning the security booth or to a central security command center) to allow implementation of additional security measures that may be desired (either automatically in response to the alert, or by the security personnel).

In some examples, the 3D size of the object crossing the ground VIL line may be analyzed to determine the type of object that crossed the VIL line. When using a single ground VIL line, speed of the object may be estimated by detecting the speed of the object using standard video analytics. The speed of the object may be used to determine a relative spacing between the plurality of cross sectional outlines and thus determine a 3D outline of the object. Alternatively, or in addition, plural ground VIL lines may be established along the expected path of a vehicle on the road. The cross sectional outlines (height and width) detected by two ground VIL lines may be matched and thus the speed of the object may be estimated by determining how long it took the same portions of the object to move from the first ground VIL line to the second ground VIL line. Based on the detected speed of the object, the distances between the cross sectional outlines may be determined.

In some examples, the two or more ground VIL lines may be placed at a spacing that allow simultaneous detection of cross sectional outlines of the object at one or more instants in time. For example, ten ground VIL lines may be established across a roadway at a spacing one foot apart. Thus, a known spacing (here, one foot) between the cross sectional outlines (height and width) obtained by each ground VIL line may be used to provide a 3D profile of the vehicle. Even if the vehicle exceeds the depth of the plurality of ground VIL lines (e.g., in this example, exceeds 10 feet), matching of the cross sectional outlines (either an exact match, or matched to an interpolated cross sectional outline obtained by interpolating heights and widths of neighboring detected cross sectional outlines) may allow obtaining the full 3D profile of the object.

In step S126, upon determining that a vehicle has completely crossed the ground VIL line, a security gate may be opened or closed. For example, a security gate at the location of the VIL line may be closed behind the vehicle and/or a security gate in front of the vehicle may be opened. In some examples, the system may be used with at a security check point. Two security gates (a forward security gate and a rearward security gate) may be used to secure a vehicle within a particular area on the road at the security check point. Upon a vehicle's approach to the security check point, the forward security gate may be closed, while the rearward security gate may be open. The VIL line may be defined to extend across the road below the rearward security gate and used to determine that a vehicle has crossed the rearward VIL line to cause the rearward security gate to close. At this time, the vehicle may be secured between two security gates (one in front and one behind the vehicle) so that the vehicle may not either proceed into the secure area or leave by reversing its direction until a security officer operating the security barrier is able to check inspect the vehicle and operator and determine that the vehicle may pass into the secure area. In an alternative security check point implementation, the vehicle may first approach closed rearward and forward security gates. After stopping in front of the rearward security gate, the security officer may approve passage of the vehicle into the secure area, and cause the rearward security gate to open (but not the forward security gate). After the vehicle passes the rearward security gate (as automatically determined based on use of the VIL line located at the rearward security gate), the rearward security gate may close. After closure of the rearward security gate, the forward security gate may open to allow the vehicle to pass.

It will be apparent that use of a barrier arm as a security gate is simply one example and other security gates may be used, such as buttress steel plate barriers that may pivot up from a flat position on the road surface, retractable bollards, or typical vertical gate panel(s) that slide horizontally away from the road or pivot around a vertical axis (e.g., by use of hinges) to allow the gate(s) to open and close and thus allow or prevent access to the secure area (for the gate in front of the vehicle) as well as similar restrictions to the security check area.

Figure 4:
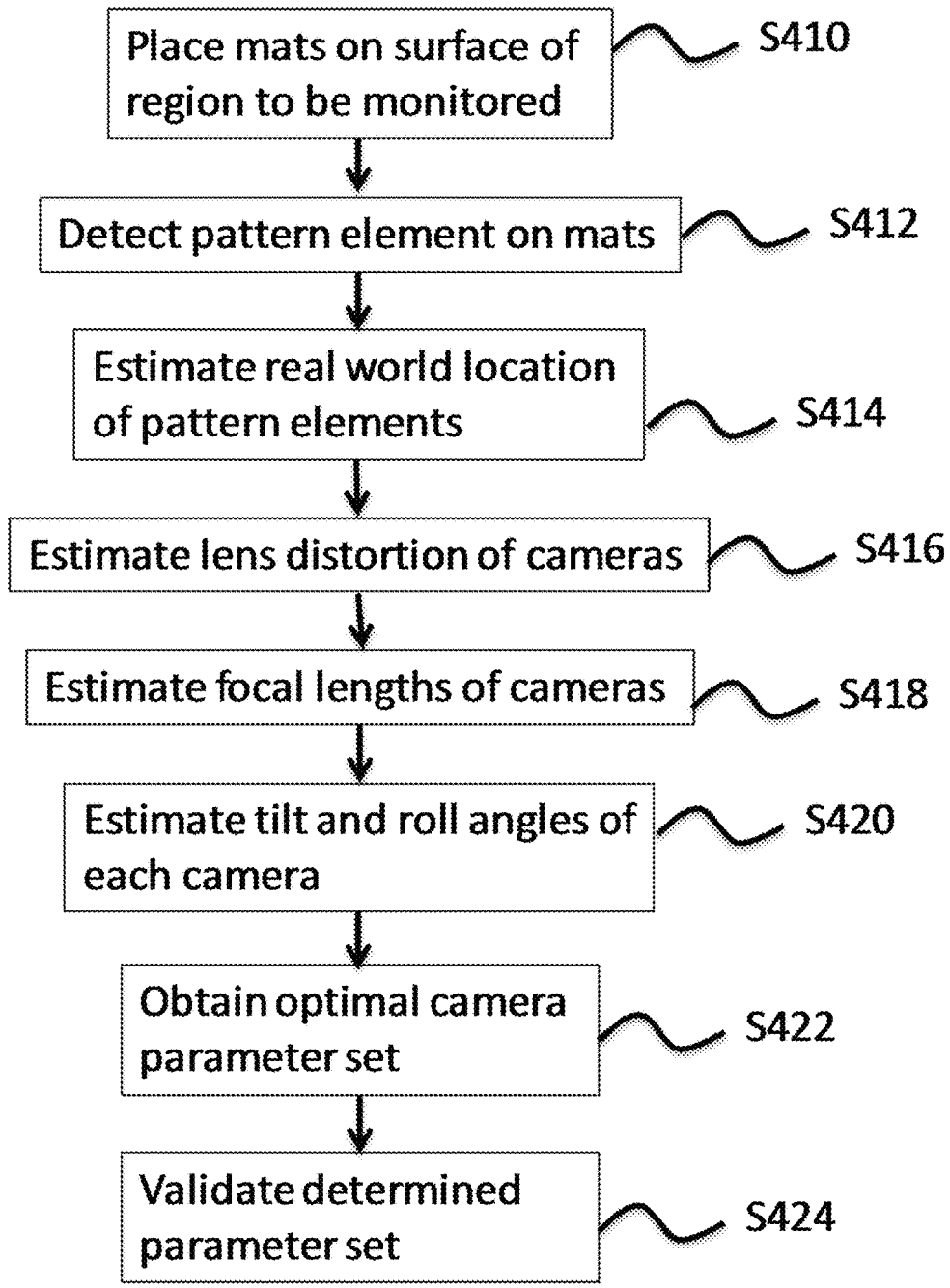
FIG. 4 is a flow chart illustrating an example process for establishing a virtual inductance loop line.

FIG. 4 illustrates an exemplary method for establishing real world virtual inductance loop line(s) at ground level (ground VIL lines) and image plane virtual inductance lines (image plane VIL lines). FIG. 4 may be implemented in a calibration mode of the surveillance system. A user may provide an input to the surveillance system (e.g., via an input device or user interface of a computer operating the surveillance system, such as a mouse, keyboard, track pad, touchscreen, etc.) to cause the surveillance system to enter calibration mode. Alternatively, detection of the existence of the mats themselves in the images taken by the cameras 210L and 210R may cause the surveillance system to enter calibration mode. The ground VIL lines and image plane VIL lines may not have been established prior to entering calibration mode, thus, the surveillance system may not perform video analysis until these VIL lines are established (e.g., to detect the presence and/or identify a type of a vehicle).

Figure 5:
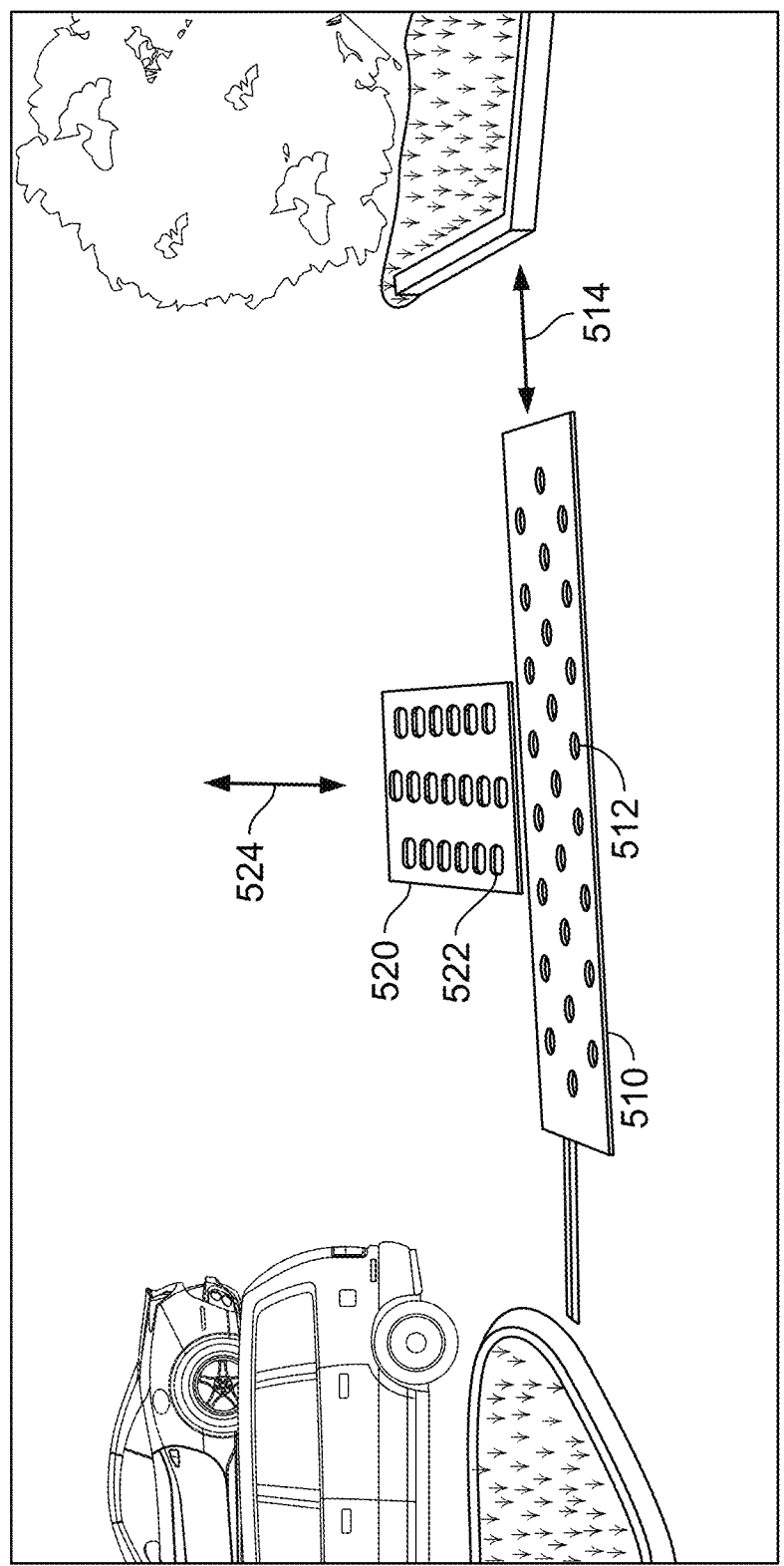
FIG. 5 is a diagram of an example virtual inductance loop system using two surface regions.

In step S410, one or more mats are placed in the region (e.g., one of 218a, 218b and 218c) to be monitored by the virtual inductance loop. FIG. 5 illustrates an example using two mats 510 and 520. Each of the mats 510 and 520 may have a visible pattern that may help cameras 210L and 210R detect the location of the mat as well as distinctive visible features of the mat. The mats may be portable so that they may be easily carried and positioned by a user. Use of rigid mats (such as a thin rigid plastic mat) may provide slightly higher accuracy. However, it has been found that collapsible mats, such as rollable mats (e.g., a rubber like mat) or foldable mats (e.g., hinged to unfold in an accordion like manner) provide sufficient accuracy and conform to the surface of the road to identify the ground plane. When implementing the method and system with a rollable mat, such as one made of thick rollable plastic or a rubber like material, it is preferable to use mats that are resistant to wrinkling so that they may be easily displaced on the road surface while maintaining a predetermined distance between pattern elements on the mat.

Here, each mat includes a pattern formed of dots (512, 522) that are arranged in three linear rows. Use of pattern elements other than dots may be implemented, but discussion herein will reference dots as the pattern elements for ease of description. Mat 510 may be placed so that the linear rows of dots 512 extend in a direction 514 that is parallel to the horizontal displacement of the left and right cameras 210L and 210R (i.e., parallel to a line extending between the cameras as viewed from a top down view). Mat 520 may be placed so that linear rows of dots 522 extend in a direction 524 of the expected direction of vehicle movement (e.g., parallel to the lane direction of the road). This placement of mats may be helpful for better disparity computations, but is not necessary. For example, mats may be placed so that they are not parallel or perpendicular to a line extending between the cameras, and/or parallel or perpendicular to the real world VIL line. In addition, placement of the cameras need not be positioned to have a head on view of the real world VIL line. It will be appreciated that the cameras 210L and 210R may be positioned to have view traffic travel away from the cameras as they approach the real world VIL line (so that cameras 210L and 210R view the rear of the vehicle). Cameras 210L and 210R may be placed at different heights. In addition, the cameras may be positioned at different heights without a horizontal offset (e.g., they may be both mounted on the same vertical pole). When a real world VIL line is established to cross a roadway where the cameras view the real world VIL line from the side, the image lane VIL lines may have a substantially vertical direction in their respective image plane. The following describes an example where the cameras 210L and 210R view traffic crossing the real world VIL line head on, with the real world VIL line running in a direction somewhat parallel to a line extending between the cameras 210L and 210R. However, it will be recognized that the description also is applicable to alternative arrangements of the real world VIL line and cameras, such as those described herein.

In step S412, each camera of the system (e.g., 210R, 210L) automatically detects the dots on the mats 510 and 520. Here, video analysis of video or still images captured by the cameras 210R and 210L automatically detect each dot 512, 522 on the mats. First, region-based segmentation method may be applied to segment each video frame into separate region blobs, each region blob is comprising connected image pixels with similar color values (e.g., pixels all within a certain threshold of a particular color value). Next, the region blobs that look similar to the "dots" on the VIL mats are detected based on their size, color and neighborhood region colors. For example, if the feature dots on the VIL mat are red dots on a green background, all the red region blobs that are surrounded by green regions will be selected. Last, all the detected neighboring region blobs will be used to form a feature array. The formed feature array may be compared with the known VIL pattern. The comparison may be used to confirm if the detected blob pattern (as represented by the feature array) matches with the known VIL mat pattern. For example, if there are 3 arrays of 7 red dots evenly placed on the VIL mat and the system detect 3 rows of 7 red region blobs evenly distributed in a local region of the image, the detection decision can be made with high confidence because this is very unlikely to happen in a random scene without the VIL mat.

Additional matching criteria may be used detect dots on mats 510 and 520. Objects identified as a parallelogram (or otherwise matching an expected geometrical shape of the mat, such as a circle, oval, triangle, etc.) are inspected to identify dots therein. First within each identified parallelogram, initially identified pattern elements are detected. The dots may be identified by comparison of shapes and sizes (where size may be area and/or length) of the initially identified pattern elements (e.g., to identify those having the same shape and size within an appropriate threshold). For example, the dots may be identified by selecting from the initially identified pattern elements those having (a) the same or substantially the same shape in the image, (b) the same or substantially the same size within the image, (c) the same or substantially the same color or intensity with respect to remaining portions of the mat, (d) the appropriate size with respect to the size of the identified parallelogram within the image (e.g., a ratio of the image size of the identified pattern element to the image size of the identified parallelogram matches (within a threshold, such as +/−5%) a ratio of a known size of a dot to a known size of the mat), (e) the appropriate spacing between each other (e.g., if some of the initially identified pattern elements have an expected hexagonal arrangement on the mats, or some are evenly spaced along a line as expected, the dots may be identified as those initially identified pattern elements corresponding to a similar arrangement and/or spacing in the image (e.g., consistent with a real world to image plane transformation)), and/or (f) matching an expected number (e.g., if an initially identified pattern element is not initially identified as a dot due to a partial occlusion, shadow, reflection, etc., it may be considered a dot if its location is at a location where a dot is expected to be located (e.g., if the mat includes 9 dots arranged in a line along a row, if 8 out of 9 dots have been identified, the location of the $9^{th}$ dot may be identified by knowing the expected location of the missing dot within the 9 dot linear pattern and examining the existence of an identified pattern at that location).

At step S414, real world locations of the dots 512, 522 are estimated. Dot location (e.g., dot center or other identifiable point of the pattern element) may be determined based on initial calibration parameters of the surveillance system. Use of initial calibration parameters may not be necessary, but may be help the surveillance system find the optimal calibration parameter more quickly. When the calibration process is a global optimization process, the initial values may provide a bound to the search range and prevent the optimization process stop at some local optimal points. The initial calibration parameters may comprise camera height (e.g., with respect to a ground plane at which the mats 510, 520 rest), camera tilt angle, camera roll angle, camera azimuth angle, location of the dots 512, 522 in the image plane (e.g., pixel location of the center of the dots 512, 522), and internal camera parameters, such as lens distortion and focal length. Such initial calibration parameters may be input by a user during set up of the surveillance system (e.g., height, camera tilt angle and camera roll angle may be measured after camera placement, while internal camera parameters may be input based on information provided by the camera manufacturer). For examples of calibration procedures that may be used to obtain initial calibration parameters, see U.S. Pat. No. 7,801,330, issued to Zhang et al. on Sep. 21, 2010, the contents of which are incorporated herein by reference in their entirety.

Based on such initial calibration parameters, an angle α between a line from the camera to the dot (e.g., dot center) and the vertical direction may be determined, and thus, based on the known height of the camera, a distance r from a location below the camera at the ground plane to the dot may be determined (i.e., r=h×sin (α)). FIG. 6 illustrates such relationships with respect to a line from the camera to the center of an "X" to represent a location of a center of a dot. Dot location in the real world may be represented in Cartesian coordinates (x, y, z). For example, assume the origin of the Cartesian coordinate system representing locations in the real world is located at O below the camera in FIG. 6, that z represents a height of the object and (x, y) represents a location of the object in a horizontal plane parallel to the ground plane. The (x, y) location can then be determined by the distance r and an azimuth angle between the line from the camera to the dot center with respect to the coordinate system's x and y axes. It will be appreciated that the height (z) of the object with respect to the ground plane should be known to determine the (x, y) horizontal plane location of the object (e.g., if the "X" was viewed by the camera of FIG. 6 at the same angle α but at a location above the ground plane, the depth d and distance r would both be shorter).

In steps S416, S418, S420 and S422, the initial calibration parameters of the surveillance system (such as parameters of the cameras 210L and 21R) are adjusted based on the calculated real world locations of the dots 512, 522. In step S416, lens distortion for each camera 210L and 210R is estimated based on the calculation of the real world locations of the dots 512, 522. For example, the calculations of the real world locations of dots 512, 522 in step S414 may indicate that the dots are positioned on a slightly curved line, rather than a straight line. By knowing that the dots are actually placed on the mats 510, 520 in a straight line, the determination of a curved line positioning may be attributed to lens distortion (or more particularly, to improper initial estimation of lens distortion used to initially estimate the real world locations of dots 512, 522 in step S414. Correction of lens distortion parameters may be parameters associate with a first-order radial distortion model, but other lens distortion models may be used.

In step S418, camera focal length of each camera 210L and 210R is estimated. The system may determine focal length based on vanishing point detection, which may comprise detecting an intersection location (in the image plane) of the lines extending through the dots. The focal length may be estimated from the camera field of view. The array of VIL dots on the VIL mat provides a set of parallel orthogonal lines on the real world ground. The horizon line in the camera view can be computed from these parallel orthogonal lines. The horizon lines indicate a direction corresponding to a 90 degree tilt up angle of the camera, thus the field of view angle between the horizon line and the VIL mat center can be determined. When the distance between the camera and the VIL mat is much greater than the size of the VIL mat, the camera vertical field of view can be estimated from the angle between the VIL mat center and the horizon line and their corresponding image distance.

In step S420, the tilt angle and the roll angle of each of the cameras are estimated. The tilt angle may be determined based on comparison of the measured horizontal lengths to the measured vertical lengths of the mats 510, 520 (or of other known features, such as pattern sizes, on the mats). For example, the ratio of the length (considered to be the long dimension) to width (perpendicular to length from a top down view) of mat 510 may be previously known. The measured ratio of the length to width of mat 510 as it appears in a camera's image plane (e.g., as it appears as shown in FIG. 5) may be calculated. The difference in the two ratios may be attributed to the camera's tilt angle. The tilt angle may be an angle between the horizon and a central axis of the camera lens. The roll angle of each camera may be determined as the angle between direction 524 (the row direction of the linear rows of dots 512 of mat 510) and the horizontal direction of the image plane of the camera. The horizontal direction in the image plane may be the same as the longer dimension of a rectangular display (and may be parallel to a line of pixel sensors (i.e., photodetector) of the image sensor that extend in the longer direction of a rectangular array of the pixel sensors of the image sensor). Assuming there are two perpendicular line segments on the ground plane with same length, one line is in parallel with a line extending between the two cameras 210L and 210R, which is also in perpendicular to the camera viewing direction. The difference in lengths of these two lines in a camera's image plane is mainly determined by the camera viewing angle. Thus the camera view angle can be estimated using two orthogonal line segments with known lengths. The known lengths between detected VIL dots on the VIL mat may be used to provide the lengths of these two orthogonal line segments. When the lengths of the two orthogonal line segments are the same, a ratio of 1 indicates completely overhead camera view, and a very large ratio implies near 90 degree viewing angle. For a position close to the middle of the image, the angle can be computed as: viewing angle=arccosine(height/width). When the length of the two orthogonal line segments are not the same (e.g., it is known that the horizontal line segment length is five times as large as the vertical line segment length), appropriate adjustments to the calculations may be made (e.g., the ratio may be made between 5 times the vertical line segment length and the horizontal line segment length).

In step S422, the optimal camera parameter set is obtained. The camera calibration parameters computed in steps S416, S418 and S420 may not be true in reality. Thus the camera parameters obtained in steps S416, S418 and S420 may not be accurate enough. In the next step we perform further search to find the optimal parameters around those initial estimations. For example, gradient-based optimization method as well as numerical method optimization may be used. A search is performed from coarse step to fine step on the values around the original estimations. For example, each estimated initial camera parameter may be modified a predetermined amount (e.g., +/−1%). Each possible combination of the modified camera parameters may provide a camera parameter set with which the locations of the dot patterns on mats may be estimated. Resulting dot pattern locations associated with each set may provide a new camera parameter set, from which further parameter modification and dot location estimation may be made (e.g., using deviations from this new parameter set at smaller increments, such as +/−0.5%). The optimal parameter set may be determined as the camera parameter set that brings the minimal mean matching distance error between the computed VIL dots locations and their actual relative locations. Take two VIL dots for example, given a set of camera calibration parameters, their ground locations and then their ground distance between these two VIL dots can be computed. If their computed ground distance is the same as their actual known distance on the VIL mat, the distance matching error is zero. The goal of the optimization process is to find the set of the parameters that minimize the mean distance matching error (of the known distance and calculated distance) over all the VIL dot pairs. Determining the optimal parameter set may also take into account differences in calculated real world locations of the VIL dots of the different cameras. Thus, the set of parameters of multiple cameras that minimize the mean distance of each camera's matching error and of difference in calculated real world locations of the VIL dots may be used to determine the optimal cameral parameters.

In step S424, after obtaining adjusted camera parameters, the new camera parameters and/or determined real world location of the mats 510, 520 and/or dots of the mats 512, 514 may be validated. Validation may be performed by displaying images captured by each camera with a corresponding virtual mat pattern superimposed on each of these images. For each camera, the virtual mat pattern may be determined based on the determined real world location and orientation of the appropriate mat (510 or 520) using the known locations of the VIL dots on that mat, as translated to the image plane of the appropriate camera based on the determined optimal camera parameters. It will be appreciated that the views of the virtual mat as translated to the image planes of each camera may differ from each other (as they are translated to differently positioned image planes). The determined real world location may be a single location (e.g., a single (x,y,z) coordinate) of the mat, with known relative locations of dots to this single real world location used to determine the dot real world location (as well as the corresponding translated views in the image planes of the cameras (210L or 210R)). Alternatively, the determined real world location may include coordinates that identify the real world locations of the dots. A user may thus view the images with the corresponding mat pattern superimposed thereon to confirm that the determined location of the mats 510, 520 and or dots 512, 522 as well as the adjusted camera parameters are accurate. After confirming accuracy of the same, a user may provide an input to the surveillance system (e.g., via an input device or user interface of a computer operating the surveillance system, such as a mouse, keyboard, track pad, touchscreen, etc.) to cause the surveillance system to exit calibration mode.

Calibration of the camera system as performed by the method of FIG. 4 may be performed in less than three seconds and obtain an accuracy of within one inch within the region of the mats 510, 520 from a distance of 40 feet (for an accuracy of about 0.2% of the distance to the mats, or less).

Figure 7A:
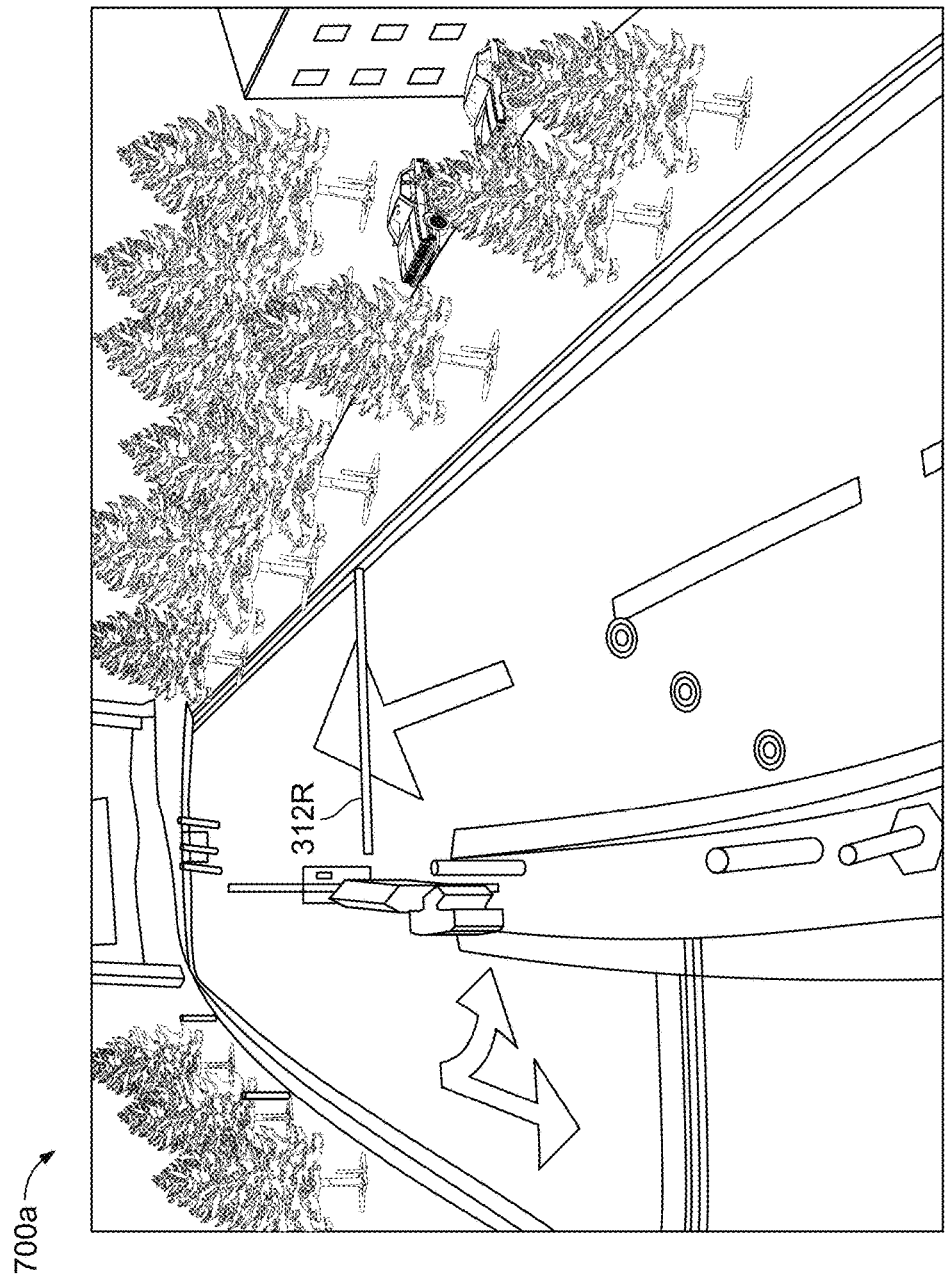
FIG. 7A-C are diagrams of examples of identifying features at a scene.

FIG. 7A shows an image 700a obtained by a camera (e.g., 210R) and image plane VIL line 312R without a vehicle present. In FIG. 7C, portion 710a is an exploded view of a portion of the image 700a where it intersects the image plane VIL line 312R. In image 700a, image portion 710a comprises a relatively higher intensity portion (between A and B) between two relatively lower intensity portions. 710a' represents shows the light intensity of image portion 710a. In this example, distinctive features $a_r$ and $b_r$ on the image plane VIL line 312R are identified by analyzing the change of intensity of image portion 710a along the length of the image lane VIL line 312R. Here, 710a" shows the change of intensity of image portion 710a (e.g., a derivative of the intensity of 710a' with respect to a left to right view of image portion 710a). As image portion 710a may comprise pixel data for a line of pixels across image 700a (corresponding to image plane VIL line 312R), intensity 710a' may be the grayscale value assigned to each of the pixels in this line of pixels. In some examples, the image plane VIL line is given a width that overlaps a plurality of pixels in the width direction (in the up and down direction in FIG. 7C); in this instance, the intensity 710a' at a location along the length of the image plane VIL line may be an average grayscale value of all pixels in the width direction at that location. It should be understood that line as used in this application does not exclude a line having some thickness in its width direction.

Change of intensity may then be measured as the change (with respect to the length direction, or left to right in FIG. 7C) in grayscale values of neighboring pixels (or in grayscale values of neighboring sets of pixels). Alternatively, in some examples, change of intensity may be measured as the difference in an average grayscale value of neighboring groups of pixels along image portion 710a. For example, for six pixels in a row (p1, p2, . . . p6) along a segment of image portion 710a, a change of intensity between pixel p3 and pixel p4 may be represented as the difference between the average grayscale value of pixels p1, p2 and p3 and the average grayscale value of pixels p4, p5 and p6. Changes of intensity that exceed a predetermined threshold may be identified as a distinctive feature (here, $a_r$ and $b_r$). Change of intensity that do not exceed a predetermined threshold may be ignored. For example, changes of intensity that are not greater than 3 (for example) in a 256 value grayscale (e.g., 8-bit data intensity representation) may be ignored.

Each of the identified distinctive features may simply be represented (and stored in memory of the surveillance system) as (i) a location along image plane VIL line 312R, (ii) such location and a direction of the change of intensity (i.e., either a positive or negative change in intensity, representing an increase or decrease in brilliance, respectively), or (iii) such location, such direction of the change of intensity and a magnitude of the change of the intensity. It will also be appreciated that other analyses may be used to identify distinctive features, such as color analysis that may detect significant changes in color. For example, when color is represented as three color intensity components (e.g., a red intensity value, a green intensity value and a blue intensity value), a gradient for each color intensity component may be determined and used to in comparison calculations (e.g., correlation calculations) described herein. Gradients of each color intensity component not greater than 3 (for example) in a 256 value intensity representation may be ignored.

Figure 7B:
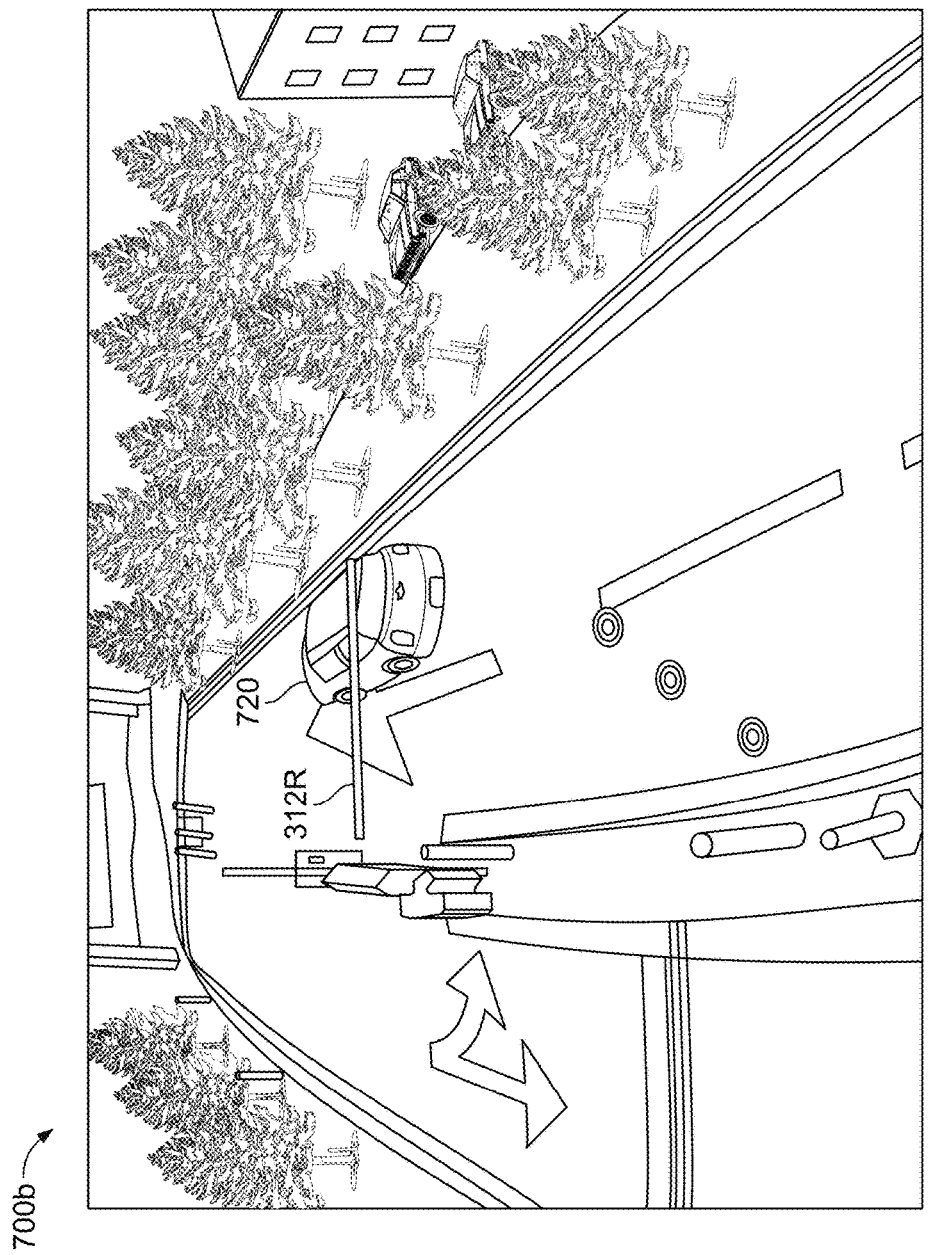
Figure 7C:
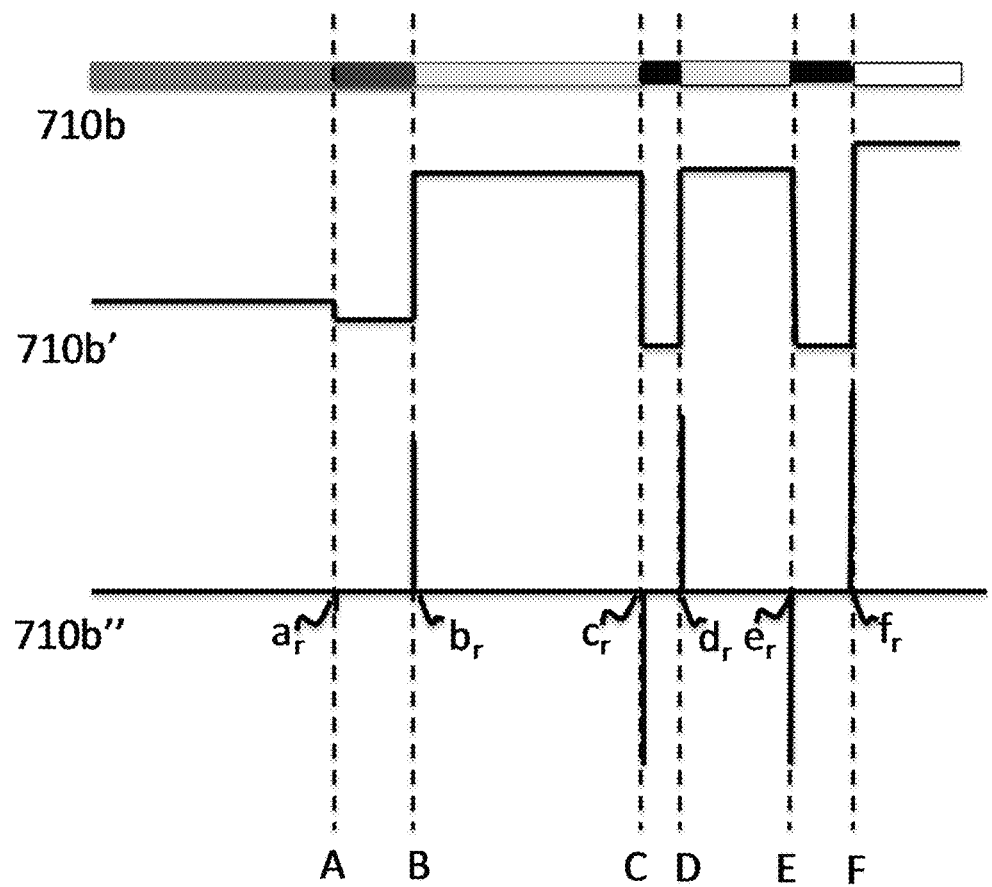

FIG. 7B shows an image 700b obtained by the camera 210R with a vehicle 720 interposed between the ground VIL line and the camera 210R as the vehicle 720 is crossing the ground VIL line. In FIG. 7C, portion 710b is an exploded view of a portion of the image 700b where it intersects the image plane VIL line 312R. 710b' shows the light intensity of image portion 710b. 710b" shows the change of intensity of image portion 710b (which may be determined as discussed herein). In this example, distinctive features $a_r$, $b_r$, $c_r$, $d_r$, $e_r$ and $f_r$ have been identified. It will be recognized that the image plane VIL line 312R is composed of the same pixels, but differences between images 700a and 700b (and more specifically, due to the presence of the vehicle occluding the ground VIL line, differences between image portions 710a and 710b) create different intensity values (e.g., grayscale values) for pixels of the image plane VIL line 312R. The different intensity patterns create different distinctive feature identification in these two examples.

While FIGS. 7A-7C show examples of identifying distinctive features in two different frames of a video taken from one camera (here, 210R), it will be understood that distinctive features are identified along each image plane VIL line of each camera. In this example, distinctive features are identified by cameras 210L and 210R on both image plane VIL lines 312L and 312R. When these identified distinctive features correspond to elements in the real world at ground level (e.g., distinctive features derived from shadows or painted lines on the road along the ground VIL line), identified distinctive features resulting from the same real world object feature are expected to be identified at the same relative location along each of the image plane VIL lines 312L and 312R.

Figure 8A:
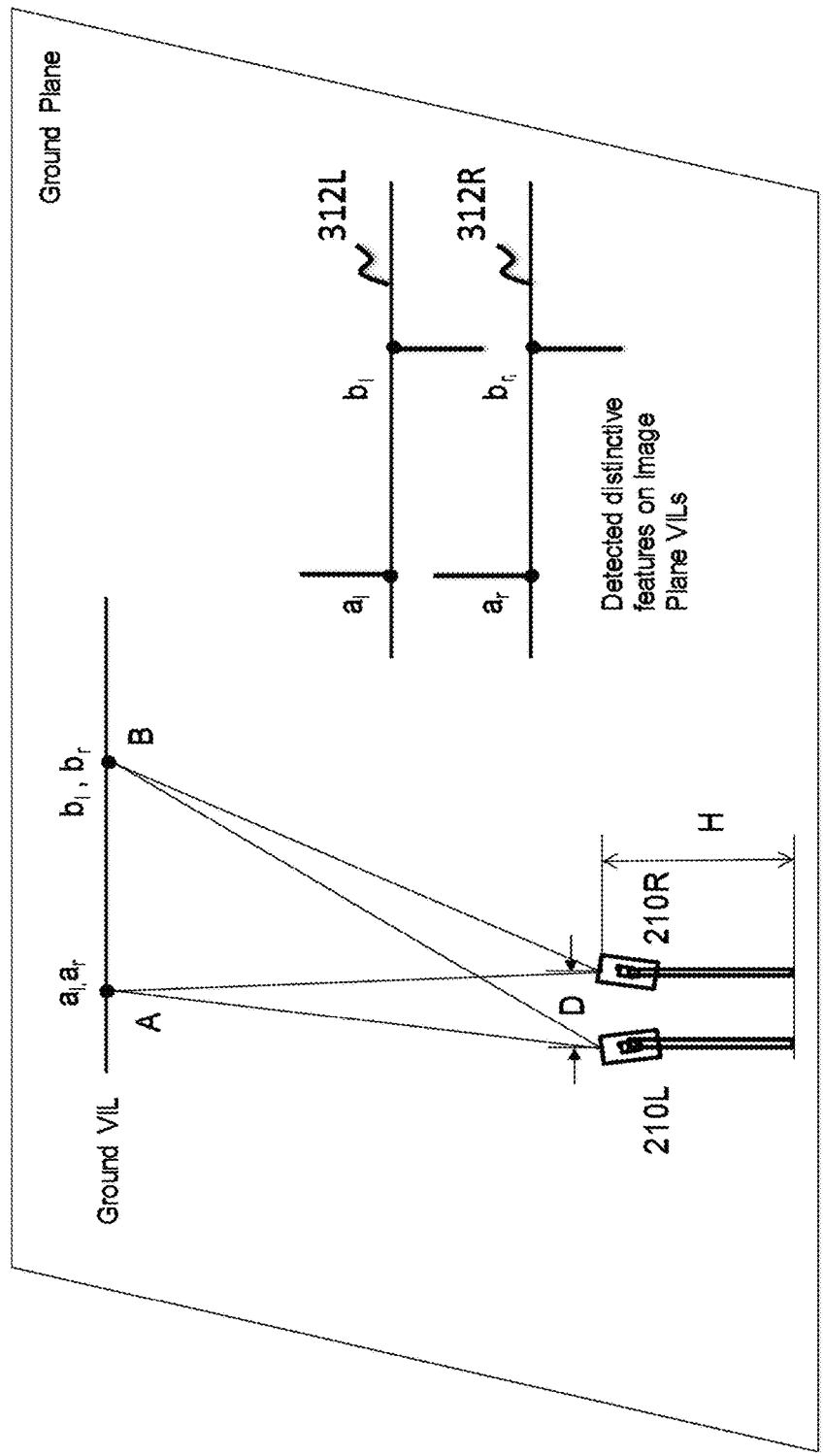
FIG. 8A is an example of cameras obtaining an unobstructed image along a virtual inductance loop line.

FIG. 8A illustrates an example of the same, with cameras 210L and 210R obtaining an unobstructed image along a ground VIL line. In this example, the ground VIL line has features at locations A and B that are identified as distinctive features along image plane VIL lines 312L and 312R (via separate analysis of the images from cameras 210L and 210R (as discussed herein)). As shown in FIG. 8A, identified distinctive features $a_l$ and $a_r$ share the same relative location along their respective image plane VIL lines 312L and 312R. Similarly, identified distinctive features $b_l$ and $b_r$ share the same relative location along their respective image plane VIL lines 312L and 312R. In addition, the direction (e.g., positive or negative) of the gradient is the same for features $a_l$ and $a_r$ (here, positive) and for features $b_l$ and $b_r$ (here, negative). Also, the magnitudes of the measured gradients (e.g., the gradient of intensity) associated with features $a_l$ and $a_r$ are the same or similar as well the magnitudes of the measured gradients associated with features $b_l$ and $b_r$. It will be appreciated that magnitude of the measured gradient may be dependent on camera characteristics (e.g., a clean v. dirty lens, sensor sensitivity, image processing firmware, etc.).

Figure 8B:
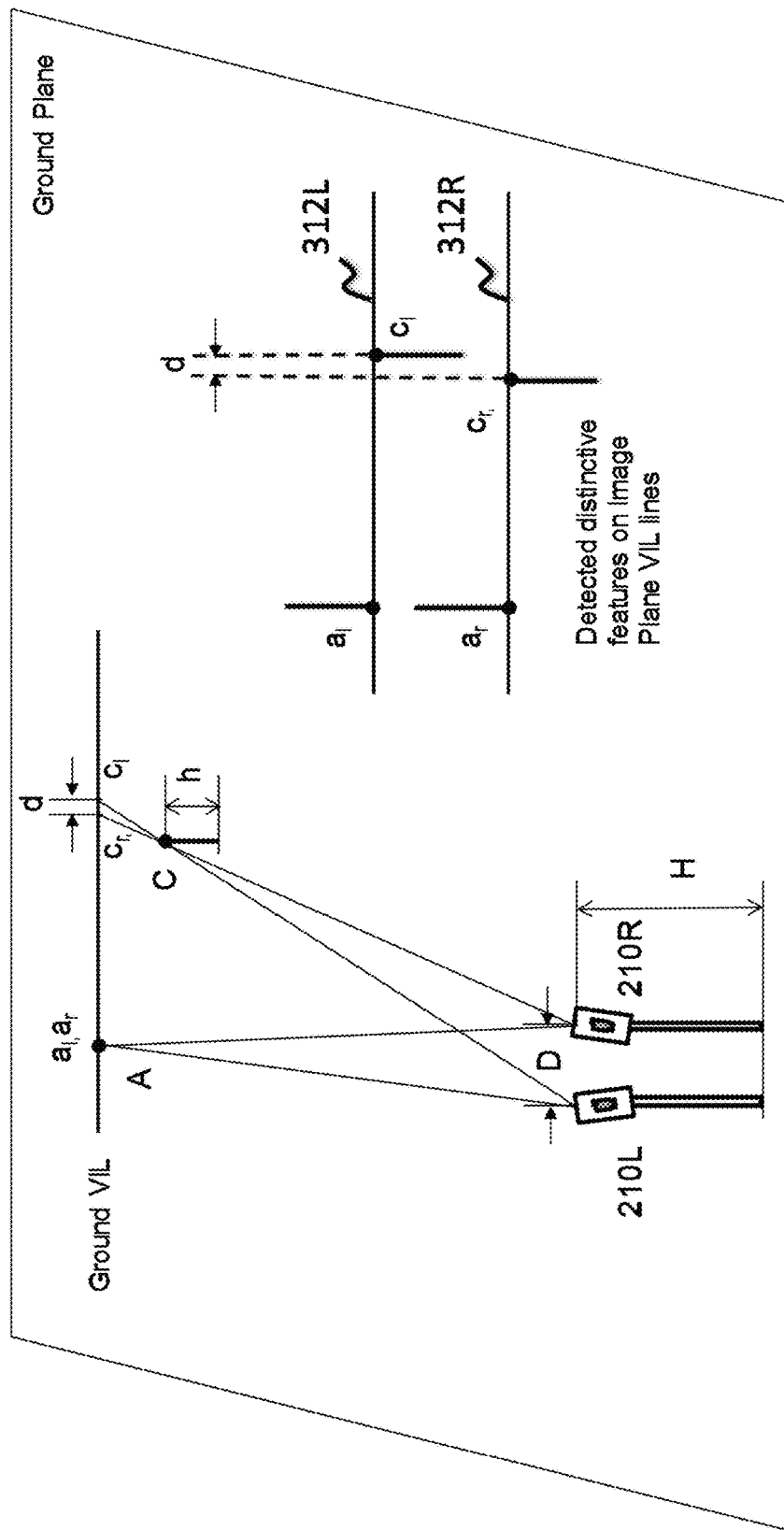
FIG. 8B is an example of a distinctive feature interposed between cameras and a virtual inductance loop line.

However, when an object (such as a vehicle) is interposed between the ground VIL line and the cameras 210L and 210R, differences in camera location cause matching identified distinctive features on image plane VIL lines 312L and 312R to differ in their relative location along each of the image plane VIL lines 312L and 312R. FIG. 8B illustrates an example where an object with a distinctive feature at location C is interposed between cameras 210L and 210 R and the ground VIL line.

In the example of FIG. 8B, the identified distinctive features $c_l$ and $c_r$ (derived from the same feature of the object at location C) are not located at the same relative location along their respective image plane VIL lines 312L and 312R. It will be appreciated that the location of the object at location C—closer to the cameras 210L and 210R than the ground VIL line—causes the deviation between the locations of the identified distinctive features $c_l$ and $c_r$ along their respect image plane VIL lines 312L and 312R. If distinctive features $c_l$ and $c_r$ as identified along their respective image plane VIL lines 312L and 312R can be recognized as being associated with the same location C in the real world, then the coordinates of the real world location C can be determined. Specifically, a distance "d" between features $c_l$ and $c_r$ as identified along their respective image plane VIL lines 312L and 312R, the distance "D" between cameras 210L, 210R, the real world coordinates of the ground VIL line can be used to detect the (x, y) coordinate of location C (its location projected onto the ground plane from a top down view). From the (x, y) location C and height H of the cameras 210L and 210R, the height h of location C above the ground plane (i.e., the z coordinate of location C) can be determined. In general, the h of location C above the ground plane may be approximated as:

$$h \approx H*d/(d+D) \qquad (1).$$

Figure 9:
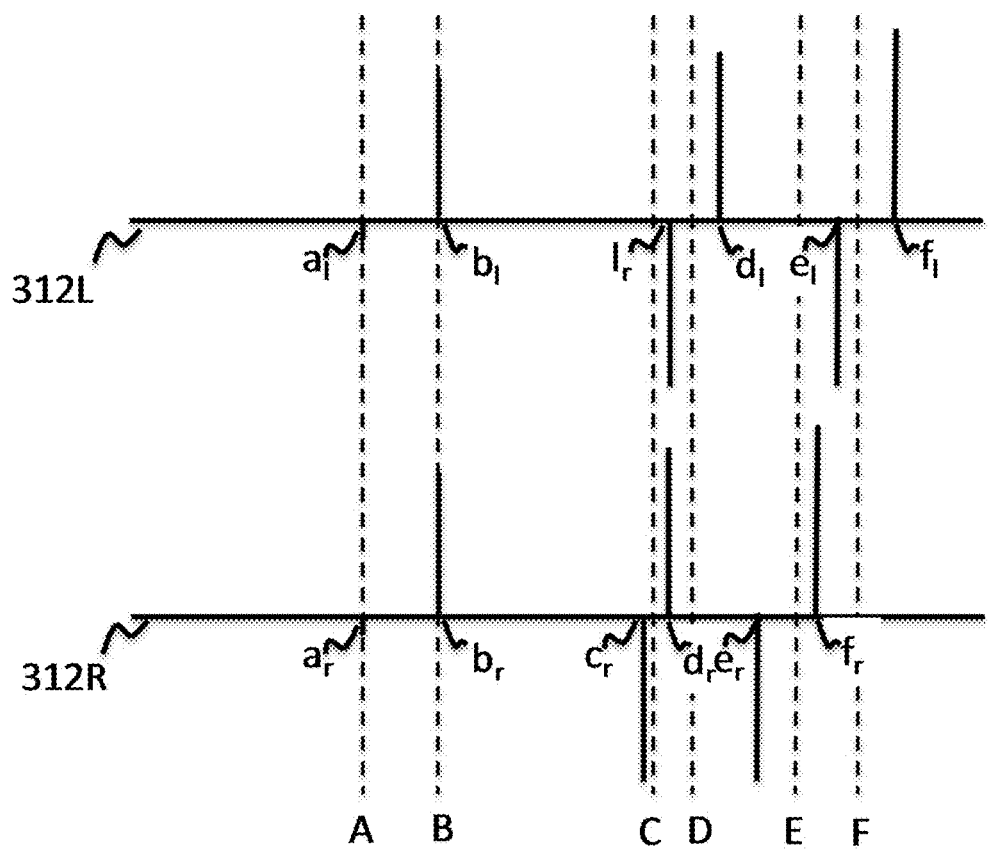
FIG. 9 is an example of identifying distinctive features at a scene.

To determine the height of identified distinctive features, in step S116 one or more of the identified distinctive features of image plane VIL line 312L are matched with a corresponding one of the identified distinctive features of image plane VIL line 312R. Multiple correlation calculations are performed to find the best match. With each correlation calculation, identified distinctive features of image plane VIL line 312L are matched with different ones of the identified distinctive features on image plane VIL line 312R. FIG. 9 illustrates a simplified example, with distinctive features $a_l$, $b_l$, $c_l$, $d_l$, $e_l$ and $f_l$ being identified along image plane 312L and distinctive features $a_r$, $b_r$, $c_r$, $d_r$, $e_r$ and $f_r$ being identified along image plane 312R due to presence of distinctive image elements on ground VIL line at locations A and B and distinctive features of an object (e.g., vehicle) at locations C, D, E and F. In FIG. 9, the matching distinctive features have been similarly labeled, but it should be understood that such matching is the goal of the correlation and such information is not provided to the surveillance system but is be determined by the surveillance system. It should also be understood that multitudes of distinctive features may be made identified on each image plane VIL line, including distinctive features of one image plane VIL line that has no match on the other image plane VIL line. For example, features of an object may be viewable by only one camera and not the other camera, or features of an object may not be identified due to not meeting a certain threshold of an intensity gradient in one camera, but not the other camera.

As noted above, multiple correlation calculations are made, with each correlation calculation making a different "guess" or match hypothesis as to which distinctive features of image plane VIL line 312L match with those of image plane VIL line 312R. For example, a first correlation may hypothesize that distinctive feature $b_l$ of image plane VIL line 312L matches distinctive feature $d_r$ of image plane VIL line 312R (as well as hypothesize matches between remaining ones of the identified distinctive features) while a second correlation calculation may hypothesize that distinctive feature di of image plane VIL line 312L matches distinctive feature $d_r$ of image plane VIL line 312R (as well as hypothesize matches between remaining ones of the identified distinctive features).

Thus, a correlation calculation may be performed for each match hypothesis of a set of identified distinctive features of one image plane VIL line match with a set of identified distinctive features of the another image plane VIL. For example, the correlation calculation may calculate a Pearson's correlation coefficient between the two sets of identified distinctive features (e.g., between distinctive features $a_l$, $b_l$, $c_l$, $d_l$, $e_l$ and $f_l$ and distinctive features $a_r$, $b_r$, $c_r$, $d_r$, $e_r$ and $f_r$ in the simplified example of FIG. 9). Considering a set X of n measurements (e.g., gradient of intensity measurements) for an image plane VIL line 312L and a set Y of n measurements for along image plane VIL line 312R, where identified distinctive features along image plane VIL line 312L are represented as $x_i$ and identified distinctive features along image plane VIL line 312R are represented as $y_i$ for i=1, 2, ..., n, then the sample correlation coefficient can be used to estimate the population Pearson correlation r between X and Y. The sample correlation coefficient may be written as:

$$r_{xy} = \frac{\sum_{i=1}^{n}(x_i - \hat{x})(y_i - \overline{y})}{ns_x s_y} = \frac{\sum_{i=1}^{n}(x_i - \overline{x})(y_i - \overline{y})}{\sqrt{\sum_{i=1}^{n}(x_i - \overline{x})^2 \sum_{i=1}^{n}(y_i - \overline{y})^2}}. \quad (2)$$

where $\overline{x}$ and $\overline{y}$ are the sample means of X and Y, and $s_x$ and $s_y$ are the sample standard deviations of X and Y. Repeating this correlation calculation for each match hypothesis provides a correlation coefficient associated with a corresponding match hypothesis. The correlation coefficient that indicates the highest degree of correlation (e.g., the highest value) may be used to determine which match hypothesis is an actual match between the identified distinctive features of each image plane VIL line. The match hypothesis associated with this correlation coefficient (indicating the highest degree of correlation) may be assumed to represent the correct matching of the different identified distinctive features and used as the optimal matched distinctive features for determining characteristics of the object (and/or determining a lack of an object) as described below.

These initial correlation calculations may make several assumptions to restrict which distinctive features may be matched to narrow the set of correlation calculations that need to be made. As a first example, distinctive features of image plane VIL line 312L should be at the same relative location (within an acceptable tolerance margin) or further to the right of a matching distinctive feature on image plane VIL line 312R. Matching a distinctive feature of the image plane VIL line 312L that has a location significantly to the left as compared to the location of the distinctive feature of the image plane VIL line 312R would indicate that the real world object corresponding to this feature is located past the real world VIL line (having a negative height below a road surface, e.g.). As a second example, for a set of matched distinctive feature pairs, the distinctive features of the set should have the same order on their corresponding image plane VIL lines. Thus, if sequencing through the set of matched distinctive feature pairs in an order of left to right of distinctive features of one image plane VIL line (e.g., image plane VIL line 312L), the matched distinctive features of the set of matched feature pairs of the other image plane VIL line (e.g., image plane VIL line 312R) should also appear in an order of left to right. For example, in FIG. 9, a set of matching distinctive feature pairs including ($b_l$, $f_r$) and ($f_l$, $b_r$) would violate the restriction of this second example. As a third example, it may be required that the gradient value of each pair of matched distinctive features both be positive or both be negative. The correlation calculation resulting in the lowest probability of error is selected as representing the correct matching of the different identified distinctive features (i.e., those features that are matched in that correlation calculation are considered the optimal matched distinctive features).

The optimal matched distinctive features may be used to determine real world location of the distinctive features of an object (e.g., vehicle) obstructing the ground VIL line in step S118. Referring to FIG. 9, by matching identified distinctive features $a_l$, $b_l$, $c_l$, $d_l$, $e_l$ and $f_l$ respectively with identified features $a_r$, $b_r$, $c_r$, $d_r$, $e_r$ and $f_r$, the locations (e.g., real world x, y, z coordinates) of each of points A, B, C, D, E and F may be determined, as described herein.

Figure 10:
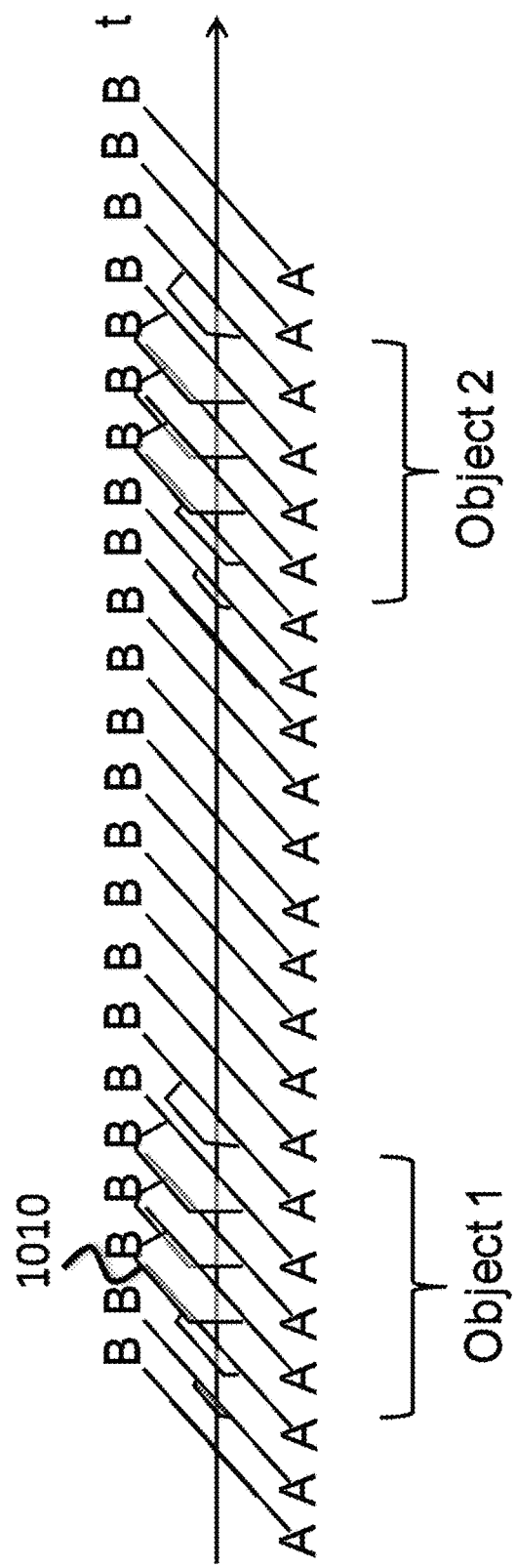
FIG. 10 is an example of cross sectional outlines of objects interposed between a virtual inductance loop line and cameras.

FIG. 10 shows an example of estimated cross sectional outlines of objects interposed between the ground VIL line and the cameras 210L and 210R. FIG. 10 illustrates a plurality of cross sectional outlines 1010 that are obtained from periodically matching of identified distinctive features between the image plane VIL lines 312L and 312R. Specifically, after matching identified distinctive features in step S118, any distinctive features (that have been identified and matched) having a real world height substantially greater than zero (such as greater than zero plus a margin of error in the accuracy of positional detection), may be considered as a point on an object that is interposed between the ground VIL line and the cameras 210L and 210R. Here, points C, D, E and F are determined as points of an object at a height above the ground plane. Object points C, D, E and F may then be used to identify a cross sectional boundary of the object interposed between the ground VIL line and the cameras 210L and 210R. Portions of the cross sectional boundary of the object not identified by such object points, may be estimated via interpolation between the locations of neighboring points (e.g., interpolation between the locations of object points C and D). Such cross sectional outline may represent the outer surface of the object interposed between the ground VIL line and cameras at time $t_n$. By periodically repeating steps S112, S114, S116, S118 and S120, a plurality of cross sectional outlines 1010 obtained at times $t_n$, $t_{n+1}$, $t_{n+2}$, ... $t_m$ may be obtained, such as those shown in FIG. 10.

Based on the plurality of cross sectional outlines 1010, various analyses may be performed. For example, it will be apparent that after initially detecting an object interposed between the ground VIL line and cameras 210L, 210R, failure to detect an object interposed between the ground VIL line and cameras 210L and 210R may be used to estimate that the object has passed the ground VIL line (step S122). A sequential, uninterrupted series of cross sectional outlines 1010 from first detection to last detection of an object obstructing a ground VIL line can be estimated to be cross sectional outlines of one continuous object. These cross sectional outlines of a single object can be analyzed to determine the size of the object and estimate the type of the object (e.g., if the object is a person, bicycle, motorcycle, car, truck or other type of vehicle) (step S124). Appropriate action may then be taken based on the information obtained in steps S122 and S124, such as operation of a security gate (S126).

In some examples, motion detection may be used to improve the performance of the system. For example, motion detection may be used to predict and/or confirm the presence of an object crossing the real world VIL line, such as by detecting an object, tracking the movement of the object as it approaches, crosses and passes over the VIL line. As another example, if there is no motion detected, the system can skip processing or process at a lower frequency (e.g., repeat steps S112 sot S120) to save computing resources. Without detection of significant motion when a valid target is detected using the VIL loop of the embodiments herein, lower confidence may be applied to the detection and further analysis may be performed by the video surveillance system prior to making a determination and/or acting on the determination. In some examples, without detection of significant motion upon detecting a valid target, the system may update the ground background model, which may have slightly changed due to environmental changes. On the other hand, detecting significant motion at the time of detecting a valid target using the VIL loop described herein, may be used to increase the VIL loop detection confidence. Such confidence may be reflected in lowering a threshold (or not raising a threshold) used to make a determination, such as a threshold over which the correlation calculation result must be greater, or a threshold over which intensity gradients must be greater to be made part of further analysis, such being as part of a correlation calculation.

Figure 11:
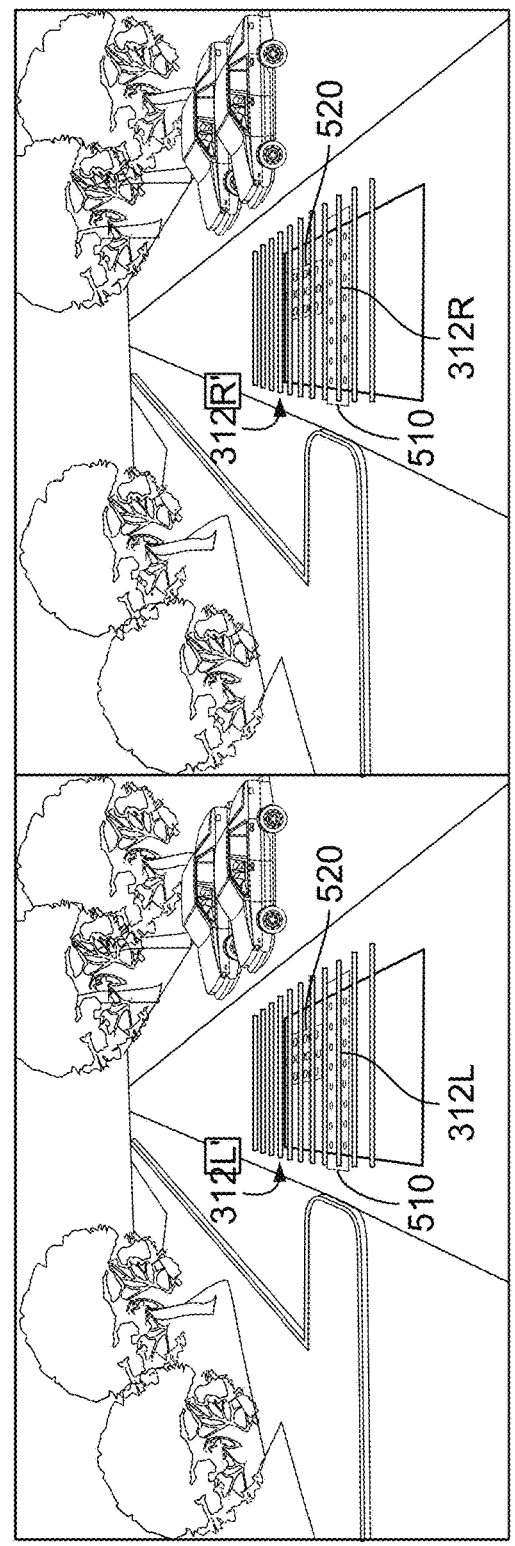
FIG. 11 is an example of generating additional virtual inductance loop lines.

FIG. 11 illustrates an example of establishing additional ground VIL lines. In FIG. 11, mats 510 and 520 are used to establish a first ground VIL line and associated image plane VIL lines 312L and 312R, such as described herein with respect to FIG. 3 and step S110. Additional ground VIL lines and associated additional image plane VIL lines 312L' and image plane VIL lines 312R' may then be established based on a predetermined offset distance (e.g., programmed and/or selectable by a user) from the first ground VIL line. For example, an additional ground VIL line may be established to be offset from the first ground VIL line by one meter and at ground level. Further additional ground VIL lines may be established at ground level and spaced apart from neighboring ground VIL lines at a pitch of one meter. The establishing of the additional ground VIL lines may be performed by determining the real world locations of the ends of the first ground VIL line (associated with 312L and 312R) and having ends of the additional ground VIL lines spaced one meter apart from the same on the ground plane in a direction perpendicular to the first ground VIL line. Image plane VIL lines for each camera may then be established for each of the additional ground VIL lines (e.g., an additional image plane VIL line 312L' and an additional image plane VIL line 312R' for each additional ground VIL line). Step S112 to S126 may be performed for each of the additional ground VIL lines (and their associated image plane VIL line 312L' and image plane VIL line 312R').

In addition, step S122 and S124 may comprise analyzing a detected cross sectional outlines of an object obstructing a plurality of neighboring ground VIL lines. For example, the plurality of cross sectional outlines 1010 shown in FIG. 10 may be obtained at a single instant in time, each being corresponding to a different ground VIL line. This plurality of cross sectional outlines 1010 may be used to determine vehicle height, width and/or depth and thus provide a 3D profile of the object (e.g., vehicle) crossing the monitored region (e.g., such as one of 218a, 218b or 218c). It should be noted that a depth profile of the object may also be estimated from a single ground VIL line by estimating the speed of the moving object (e.g., through object detection and tracking through multiple frames of a video using standard video analytics).

It should be noted that comparisons between image plane VIL lines (such as discussed herein regarding identified distinctive features) may be with respect to normalized versions of the same, so that any deviation of size or location of these image plane VIL lines are taken into account. Thus, starting and ending points between these image plane VIL lines will be aligned.

Figure 12:
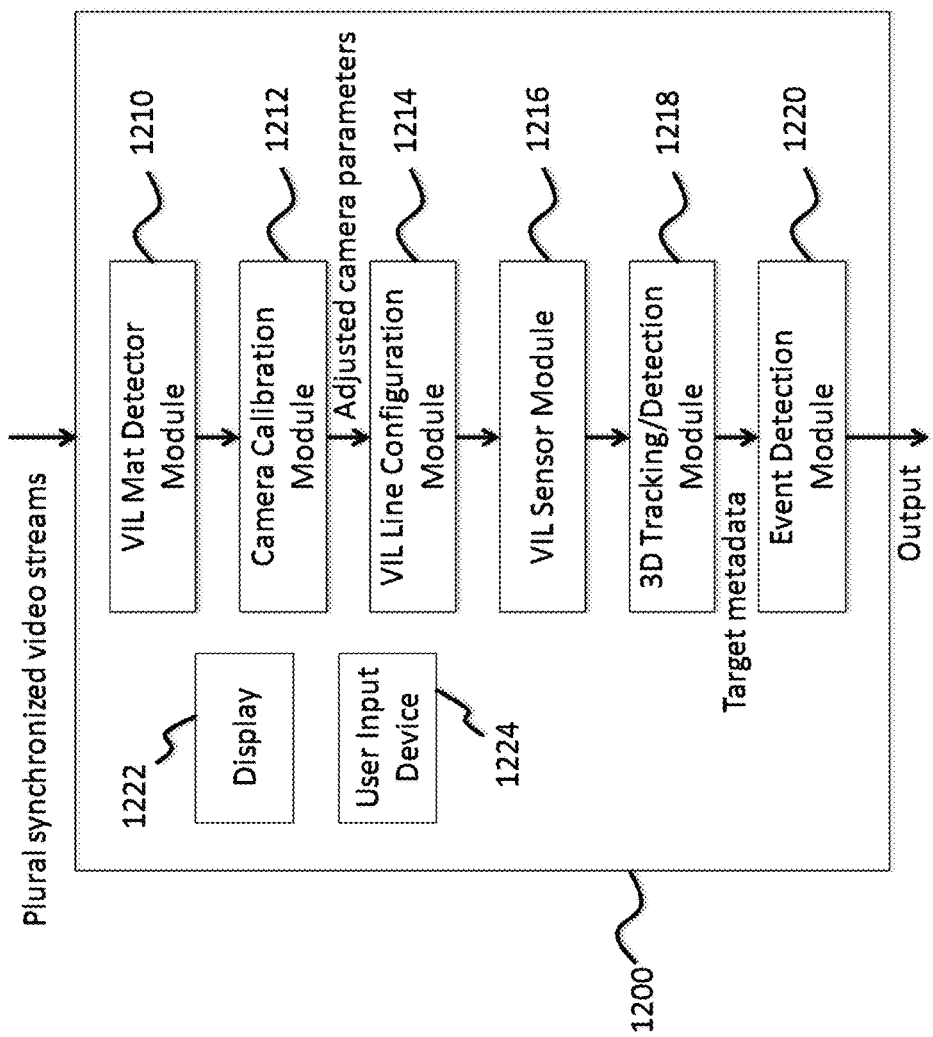
FIG. 12 is an example of a surveillance system using virtual inductance loop lines.

FIG. 12 illustrates an example of a video surveillance system 1200 configured to implement the methods described herein. The video surveillance system 1200 may be formed by a computer (e.g., general purpose computer, dedicated computer, network of computers, etc.) The modules of the video surveillance system 1200 may be embodied in separate hardware of a computer, but may also be embodied in computer hardware configured by software, where such computer hardware is shared between the modules. The video surveillance system 1200 may also include cameras that generate the plurality of synchronized video streams (such as 210L and 210R discussed herein). Alternatively, the video surveillance system 1200 may include memory (e.g., non-volatile memory, such as NAND flash memory and/or hard disk(s)) that stores previously obtained video images and provides the same to the modules shown in FIG. 12.

As shown in FIG. 12, the video surveillance system 1200 receives a plurality of synchronized video streams. The video streams may be sent to the surveillance system in real time, so that frames of different video streams received at a particular instant in time are considered to have been generated at the same time and processed as such. Alternatively, metadata identifying the time the portions of the video streams were taken may be associated with the video streams and sent with the video streams so that the video surveillance system 1200 may determine which frames of the different video correspond to the same instant time and process the video streams accordingly (as described herein).

VIL mat detector module receives the synchronized video streams and analyzes the same to detect VIL mats in the video images (such as discussed herein with respect to steps S110 and S410, S412 and S414). Camera calibration module 1212 receives pattern element location information from the VIL mat detector 1210 (e.g., real world coordinates of the pattern elements, such as dots, of the mats) and/or location and orientation information of the VIL mats. Camera calibration module 1212 then calibrates internal and external parameters of each camera that is providing one of the synchronized video streams, such as discussed herein with respect to steps S416, S418, S420 and S422 of FIG. 4. The camera parameters that are calibrated by camera calibration module 1212 may include one or more of lens distortion, focal length, camera tilt angle, camera roll angle and azimuth angle. After calibration camera parameters, the adjusted camera parameters obtained through such camera parameter calibration by camera module 1212 may be validated by displaying on display 1222 an overlay of virtual mats and pattern elements of the mats based on the determined location of the mats, locations of the pattern elements and the adjusted camera parameters. User input device 1224 (such as a mouse, trackpad, keyboard, touchscreen, etc.) may be used to confirm that adjusted camera parameters are acceptable, and thus usable by the camera surveillance system 1200 for detection during normal operation. User input device 1224 may be used to set the camera surveillance system 1200 in calibration mode and to exit the calibration mode upon validation noted herein.

VIL line configuration module 1214 may identify a ground VIL line in the real world and corresponding image plane VIL lines in each image plane of the received video streams (e.g., in each image plane of the cameras providing the received video streams). For example, a ground VIL line may be established by a line of pattern elements of a VIL mat (such as described herein with respect to step S110 of FIG. 1, e.g.). Additional ground VIL lines and associated image plane VIL lines may be established, such as described with respect to 312L' and 312R' and FIG. 11.

VIL sensor module 1216 may analyze each ground VIL line to determine cross sectional outlines (e.g., 1010 of FIG. 10) associated with one or more ground VIL lines (e.g., the ground VIL lines as identified by VIL line configuration module 1214) by a camera. VIL sensor module 1216 may perform the steps as described herein with respect to S114, S116, S118 and S120 of FIG. 1.

3D target detection and tracking module 1218 may analyze the cross sectional outlines provided by VIL sensor module 1216 to determine if an object has obstructed one or more ground VIL lines. 3D target detection and tracking module 1218 may determine a height, a width and/or depth of an object obstructing a ground VIL line, a type (e.g., person or vehicle), a classification (e.g., motorcycle, car or truck) and/or location of an object obstructing a ground VIL line, such as described herein (e.g., with respect to steps S122 and S124 of FIG. 1). These determinations may be associated with the video streams as metadata by the 3D target detection and tracking module 1218 (e.g., associate metadata with the appropriate frames of the video streams).

Event detection module 1220 analyzes the determination results provided by 3D target tracking detection module 1218 (which may be in the form of metadata or some other form) to detect an event. The detected event may be one as described elsewhere herein, such as detecting an event that a vehicle has passed a ground VIL line. Event detection module 1220 may detect events using only the determination results provided by 3D target tracking detection module 1218, or may use additional information as well, such as metadata provided by other forms of video analysis (e.g., metadata associated with object identification and object speed by analysis of the video streams).

For example, the video surveillance system 1200 may be configured to receive a plurality of video streams from multiple pairs of cameras. The multiple pairs of cameras may be directed towards a scene. The video streams from the multiple pairs of cameras may be obtained and coupled together to estimate a 3D shape of an object located at the scene. In some examples, the 3D shape of the object is determined by estimated a target height for each virtual inductance loop line that the object passes over in the scene. The various heights may be probabilistically combined to generate a profile for the object, such as a height profile.

In another example, the plurality of video streams may be obtained from cameras directed towards multiple different scenes. Specifically, there may be one or more cameras directed towards each of a plurality different scenes. The plurality of video streams may be obtained and synchronized to be further analyzed to detect features and/or events of the plurality of scenes.

Detected events may cause an output by event detection module 1220. The output may take many forms. For example, the output may cause operation of a security barrier, such as described herein (e.g., with respect to S126 of FIG. 1). The output may be adding metadata to the video streams describing the detected event. The output may be an alert (e.g., alarm) provided to a user, such as to security personnel within security booth 21. The output may be in the form of a report (e.g., when the surveillance system is used in connection with monitoring shopping habits or crowd analysis) or in the form of controlling an operation (e.g., providing an instruction or signal to cause operation of a security gate).

Figure 13A:
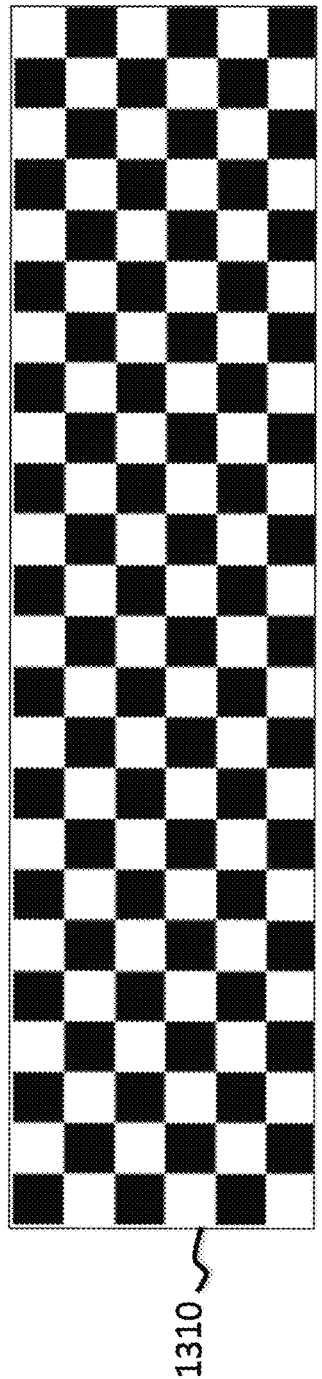
FIGS. 13A-B are examples of surface regions.
Figure 13B:
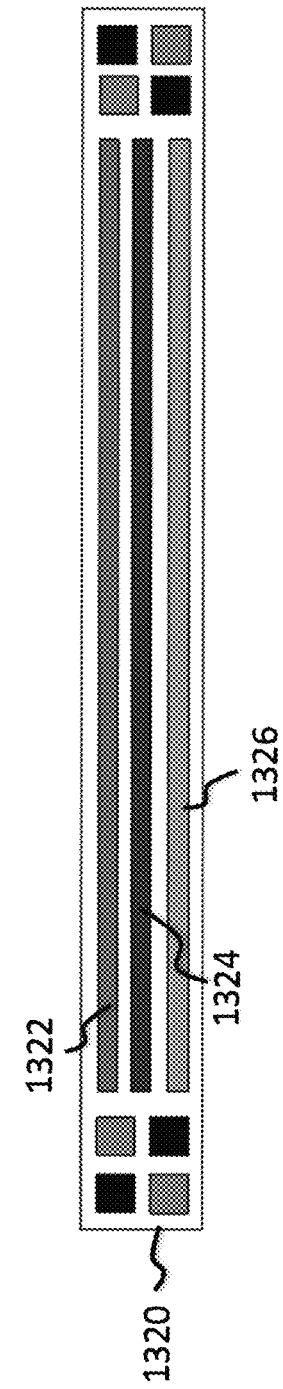

FIGS. 13A and 13B illustrate examples of alternative VIL mats (with different patterns and pattern elements) that may be used with the embodiments described herein. Mat 1310 of FIG. 13A is rectangular with a black and white checkerboard pattern comprised of black square pattern elements and white square pattern elements. Mat 1320 of FIG. 13B is rectangular having pattern elements comprising three different colored lines 1322, 1324, and 1326 extending along the majority of the mat, with two sets of four squares at the ends of mat between which the three colored lines 1322, 1324, and 1326 extend. The two sets of four squares may be symmetrically arranged and colored with respect to each set.

Figure 14:
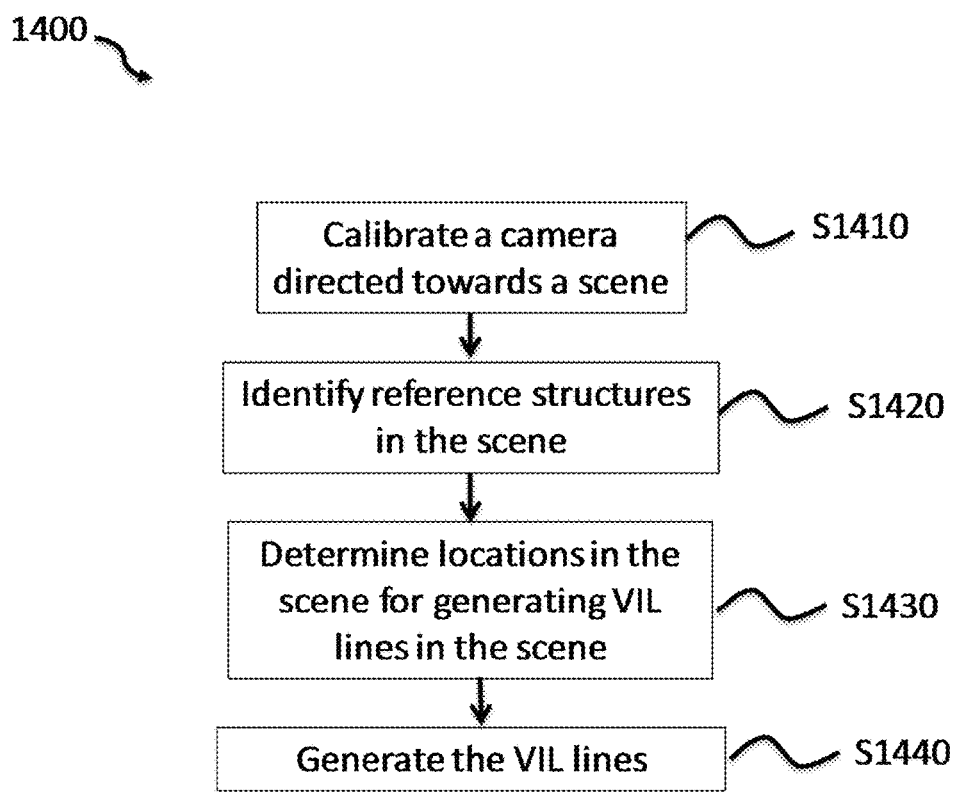
FIG. 14 is a flow chart illustrating an example process for generating virtual inductance loop lines.

FIG. 14 is a flow chart illustrating an example process 1400 for generating virtual inductance loop lines. The process 1400 can be performed by one or more processors or other computing devices. For example, operations of the process 1400 can be performed by system 1200 of FIG. 12. Operations of process 1400 can also be implemented as instructions stored on a non-transitory computer readable medium, and when the instructions are executed by one or more processors (or other computing devices,) the instructions cause the one or more processors to perform operations of the process 1400.

In step S1410, the system is configured to calibrate a camera directed towards a scene. There may be more than one cameras directed towards the scene. For example, the cameras 210R and 210L may be directed towards the scene of FIG. 2A that includes a pivoting barrier arm security gate 212 configured to lower across the roadway, thereby preventing or allowing passage of vehicles 214a, 214b, and 214c. The cameras may be calibrated independently from one another, or calibrated in unison. The camera is calibrated using calibration parameters. The calibration parameters may be received from a remote device by the system. The calibration parameters may also be received input via user input at the remote device, and received by the system. The calibration parameters can include one or more calibration parameters such as a focal length parameter, a tilt angle parameter, a roll angle parameter, and the like. The camera is calibrated so that it may view the scene in focus, and detect objects within the scene.

In step S1420, the system is configured to identify a reference structure in the scene. The process can be configured to identify more than one reference structures in the scene. For example, the system can be configured to identify mats 510 and 520 located in the scene illustrated in FIG. 5. The reference structure can include a mat such as a rollable mat, a folding mat, a constructible mat, and the like. The reference structure may be placed so that it is stationary in the scene to be observed by the camera. In some aspects, the reference structure may include a pattern of identifiers. The pattern of identifiers can include multiple identifiers with similar or different shapes and sizes. The pattern of identifiers may be observed by the cameras and compared to a predetermined set of reference structure including predetermined shapes and sizes. In this instance, a predetermined reference structure may be compared to the observed reference structure to determined locational information pertaining to the observed reference structure with respect to the camera. In certain examples, the reference structure in the scene is identified to extend in a direction parallel to a horizontal displacement of the camera. In this instance, the camera may be determined to have a roll angle of zero degrees with respect to the placement of the reference structure.

In step S1430, the system determines locations in the scene for generating virtual inductance loop lines for the scene. For example, the system may calculate the real locations of dots 512 and 522, corresponding to the respective mats 510 and 520 in FIG. 5, to determine locations in the scene at which to generate the virtual inductance loop lines. The system may determine the locations in the scene based on the identified reference structures such as the dots 512 and 522 of FIG. 5. The locations can include one or more real locations that the camera observes within the scene. In some aspects, the system determines a focal length adjustment for the camera based on the locations in the scene. The system can also determine a tilt angle adjustment and a roll angle adjustment for the camera based on the locations in the scene.

In step S1440, the system generates the virtual inductance loop lines for the scene. For example, as shown in FIG. 3, the system may generate multiple virtual inductance loop lines for the scene. In this example, the system generates a virtual inductance loop line for each of a pair of cameras directed toward the scene. Specifically, the system generates a first virtual inductance loop line 312L for a first camera, and generates a second virtual inductance loop line 312R for a second camera. The virtual inductance loop lines may be generated based on the determined locations in the scene. In some aspects, the process adjusts the calibrations parameters using the generated virtual inductance loop lines. The system can calculate an error value between the calibration parameters and the adjusted calibration parameters. In response to calculating the error value, the system may determine new calibration parameters that minimize a new error value between the calibration parameters and the new calibration parameters. The error value may be used to tune the camera. In this instance, the camera may be tuned so that it is focused to observe the generated virtual inductance loop lines at the scene.

In certain aspects, the system is configured to identify characteristics in the scene. The system can be configured to identify the characteristics in the scene based on the generated virtual inductance loop lines. The identified characteristics may be used to further generate one or more virtual references structures corresponding to the scene. In some examples, the virtual references structures may be compared to the reference structures identified in the scene. In this instance, the system can be configured to determine whether the reference structures match the one or more virtual reference structures. In other examples, the system is configured to identify non-moving objects in the scene. For example, the system can identify a 3D object left behind in regions between the virtual inductance loop lines at the scene.

Figure 15:
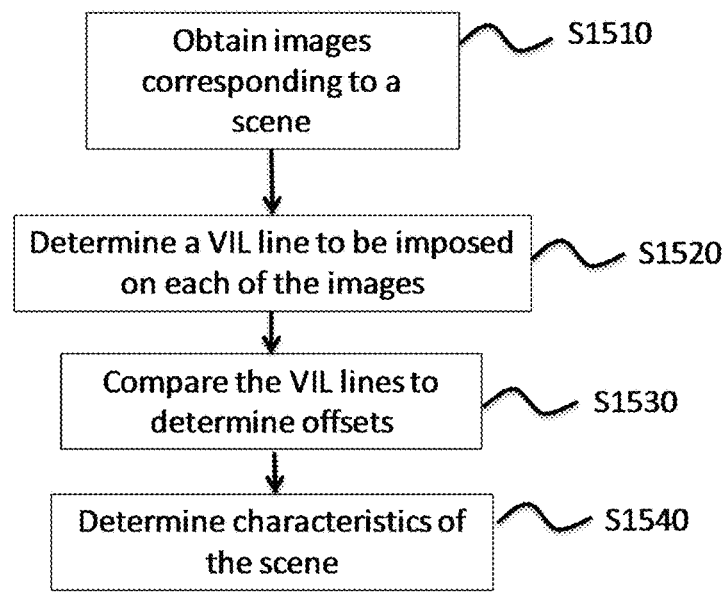
FIG. 15 is a flow chart illustrating an example process for determining characteristics of a scene.

FIG. 15 is a flow chart illustrating an example process 1500 for determining characteristics of a scene. The process 1500 can be performed by one or more processors or other computing devices. For example, operations of the process 1500 can be performed by system 1200 of FIG. 12. Operations of process 1500 can also be implemented as instructions stored on a non-transitory computer readable medium, and when the instructions are executed by one or more processors (or other computing devices,) the instructions cause the one or more processors to perform operations of the process 1500.

In step S1510, two or more cameras directed towards a scene obtain an image corresponding to the scene. Specifically, each of the two or more cameras obtain a respective image of the scene. For example, as shown in FIGS. 2A and 2B, the two cameras 210L and 210R are positioned to view the automated access control point. The image can include a single still image, a plurality of still images, a frame of a video captured by the camera, multiple frames of a video captured by the camera, and the like. In some aspects, the images are synchronized to so that multiple images received at a particular instant in time are considered to have been generated at the same time and processed as such.

In step S1520, a system determines a virtual inductance loop line to be imposed on each of the images. For example, as shown in FIG. 3, the system may generate multiple virtual inductance loop lines for the scene. In this example, the system generates a virtual inductance loop line for each of a pair of cameras directed toward the scene. Specifically, the system generates a first virtual inductance loop line 312L for a first camera, and generates a second virtual inductance loop line 312R for a second camera. The system may determine a virtual inductance loop line to be imposed on each of the images based on a change in light intensity of the virtual inductance loop lines, a change in color of the virtual inductance loop lines, a predetermined length of a particular intensity of the virtual inductance loop lines, a predetermined length of a particular color along the virtual inductance loop lines, and the like. In some aspects, the system determines the virtual inductance loop lines to be imposed on each of the images by establishing a respective ground level plane at the scene and imposing the virtual inductance loop line at the respective ground level plane at the scene for each of the images. Additionally, or alternatively, the process can determine the virtual inductance loop lines to be imposed on each of the images by identifying identifiers at the scene. The process can be configured to determine a location of each of the identifiers at the scene and generate the virtual inductance loop lines with respect to the locations of the identifiers at the scene for each of the images. In some examples, the system is configured to project the virtual inductance loop lines onto an image plane for each of the images corresponding to the scene.

In step S1530, the system compares the virtual inductance loop lines to determine one or more offsets. For example, the system may compare the virtual inductance lines 312L and 312R to determine one or more offsets. The virtual inductance loop line of each image may be compared to determine a difference between the images observed by the cameras with reference to the virtual inductance loop lines.

In step S1540, the system determines one or more characteristics of the scene. For example, FIG. 7C shows an example of identifying characteristics $a_r$, $b_r$, $c_r$, $d_r$, $e_r$ and $f_r$ in a scene. In this instance, the system uses images obtained by the cameras to identify the characteristics $a_r$, $b_r$, $c_r$, $d_r$, $e_r$ and $f_r$ at relative locations along each of the VIL lines 312L and 312R. The system may use the determined characteristics of the scene to determine whether or not an object passes over the virtual inductance loop lines corresponding to each of the obtained images. For example, if the system determines that the object passes over the virtual inductance lines based on the determined characteristics, the system may perform an action. In this instance, the action may include one or more actions such as triggering a security gate, providing an audio indication of the object passing over the virtual inductance loop lines, providing a visual indication of the object passing over the virtual inductance loop lines, and the like.

In certain aspects, the system is configured to generate cross sectional outlines of an object. The cross sectional outlines may correspond to intersections between the object and the virtual inductance lines. The system can use the generated cross sectional outlines to further determine whether or not the object has passed over the virtual inductance lines. For example, the system can determine if an object has passed over the virtual inductance lines as well as a particular direction that the object has passed over each of the virtual inductance lines. In some aspects, the system is configured to calculate a height and/or width for each of the determined characteristics of the scene. In this instance, the calculated heights and/or widths of the characteristics may be used to generate the cross sectional outlines of the object. In other aspects, the system is configured to determine a size of the object based on the generated cross sectional outlines of the object. The system may use the determined size of the object to identify the object as a particular type of vehicle, a person, an animal, a person in the vehicle, an animal within the vehicle, and the like.

Figure 16:
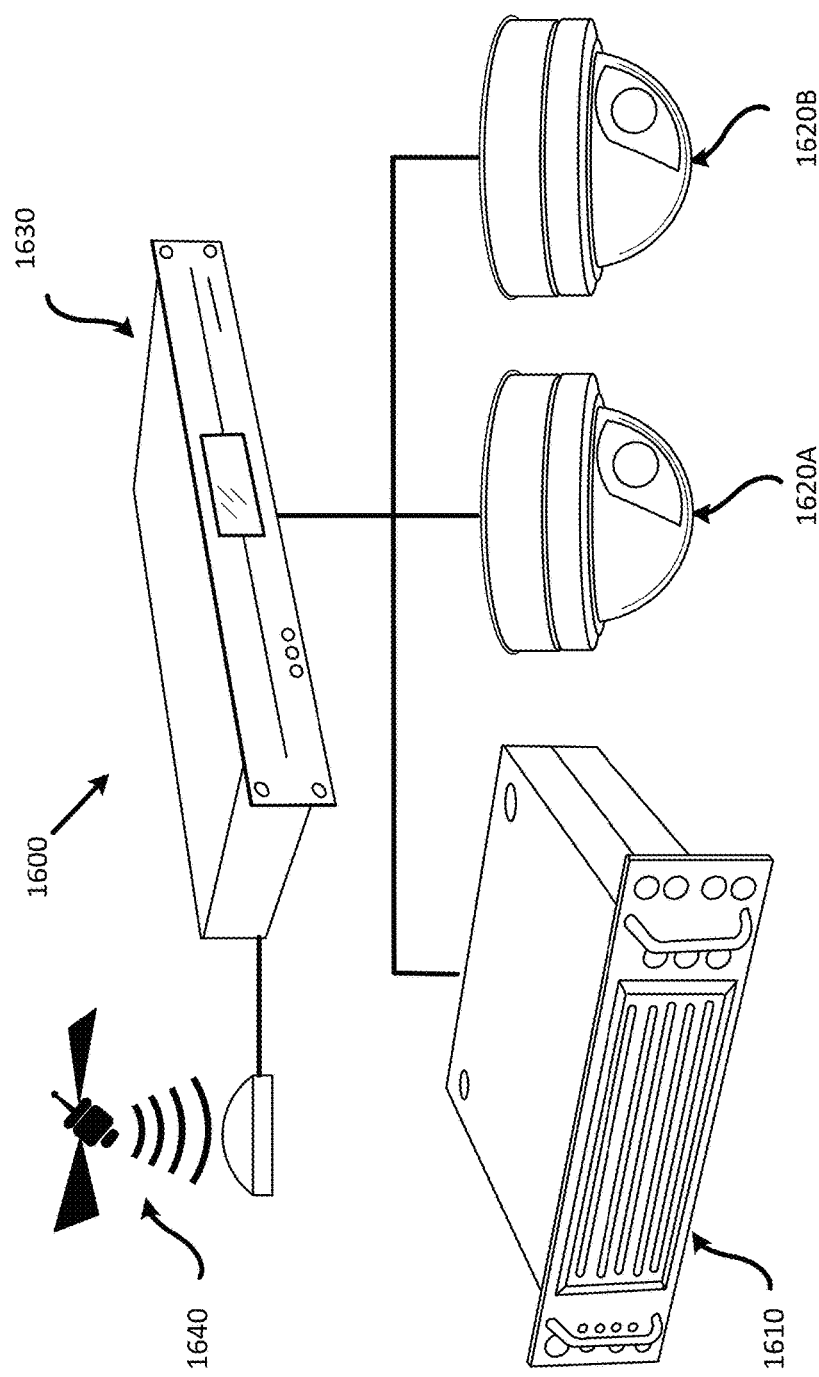
FIG. 16 is an example system for frame synchronization.

FIG. 16 is an example system 1600 for frame synchronization. The system 1600 includes a reference clock 1610, a pair of cameras 1620A and 1620B, a Network Time Protocol (NTP) server 1630, and a Global Positioning System (GPS) device 1640. The system 1600 is configured to determine 3D information of objects that fall within overlapping fields of view of the cameras 1620A and 1620B. For example, as shown in FIG. 12, the frames of images obtained by a plurality of cameras are time-synchronized so that features of the object may be determined using 3D target estimation.

The cameras 1620A and 1620B each include an internal clock that periodically checks the times of each camera. In certain aspects, the cameras 1620A and 1620b check their times using a Network Time Protocol. NTP is a network protocol developed to disseminate accurate time in a computer network, whereby internal clocks of network devices are synchronized with a hardware reference clock, such as reference clock 1610. Usually when a camera is connected to the internet, the camera's clock can be synchronized with a publicly available NTP server that is present within the same geographic region. As such, the NTP server 1630 is configured to initialize the clock settings on each of the cameras 1620A and 1620B. The NTP server 1630 can be configured to periodically correct for any clock drifts that occur on the cameras 1620A and 1620B.

The NTP server 1630 may be a GPS based NTP server that synchronizes the IP camera's clock with that of the same. In this instance, the NTP server 1630 may be connected to a GPS device 1640 over a network. The NTP may periodically check the camera clocks for clock drifts. When clock drifts are detected at the cameras 1620A and 1620B, the cameras' internal clocks may be reset by the GPS based NTP server 1630. In some examples, a video plugin is used to minimize synchronization errors in the video feeds received from the cameras 1620A and 1620B.

Figure 17:
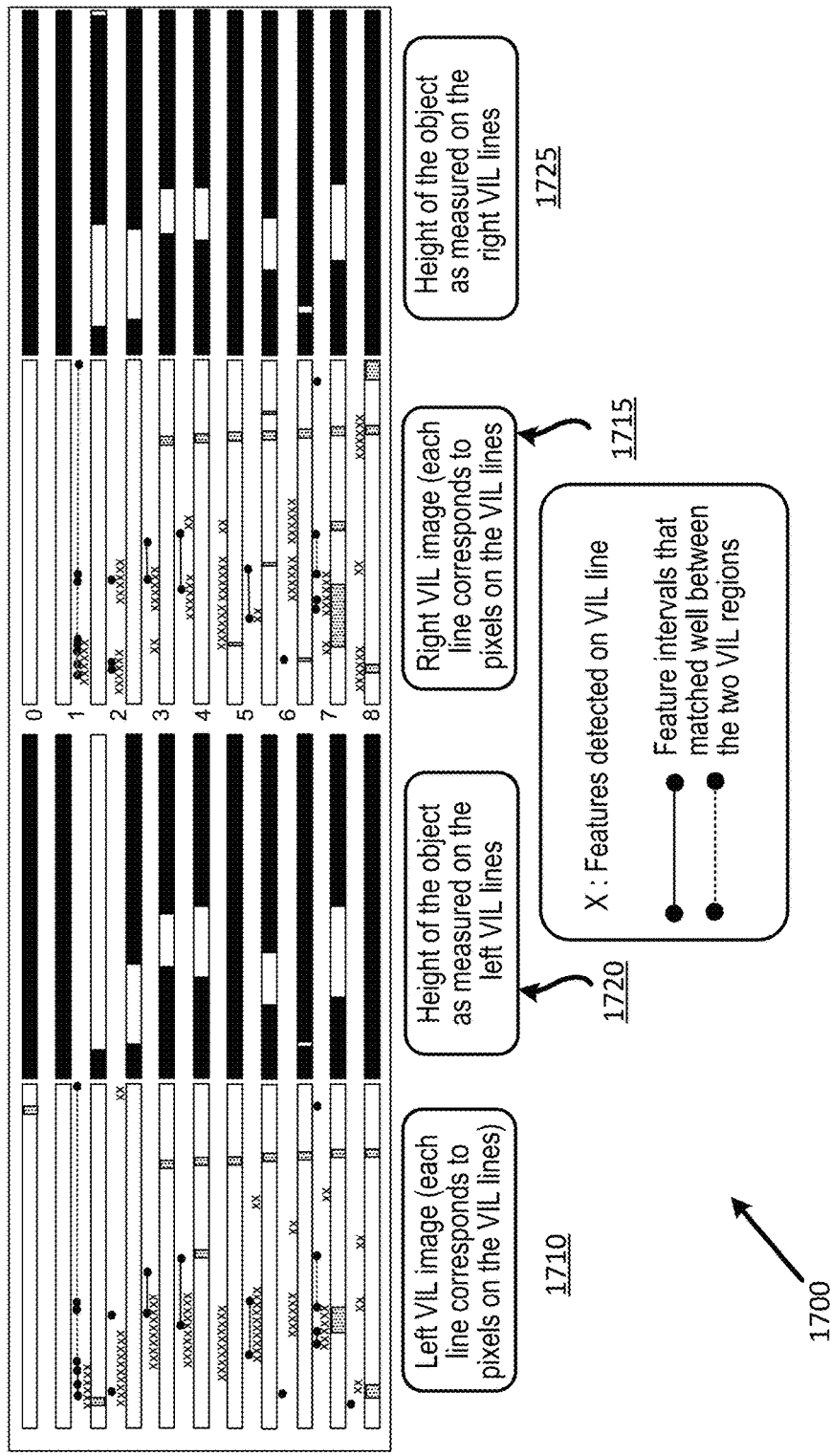
FIG. 17 is an example diagram of feature detection and matching.

FIG. 17 is an example diagram of feature detection and matching 1700. The diagram of feature detection and matching 1700 includes a left virtual inductance loop line image 1710 and a right virtual inductance loop line image 1720. The example diagram of feature detection and matching 1700 illustrates a debugging tool that is configured to analyze the functioning of the virtual inductance loop line system.

Each of the left 1710 and right 1720 virtual inductance loop line images include a plurality of lines. Each line in the images 1710 and 1720 correspond to pixels of the respective images 1710 and 1720 on the virtual inductance loop lines. The left virtual inductance loop line image 1710 is analyzed by the virtual inductance loop line system for features of the scene the left camera is directed towards. The features of the image 1710 may be used to determine a height 1715 of an object that passes over the established virtual inductance loop lines of the left image 1710. The right virtual inductance loop line image 1720 is also analyzed by the virtual inductance loop line system for features of the scene the right camera is directed towards. The features of the image 1720 may be used to determine the height 1725 of the object that passes over the established virtual inductance loop lines of the right image 1720.

For example, referring to FIG. 1, the virtual inductance loop lines may be analyzed by the debugging tool to detect cross sectional outlines of an object obstructing a plurality of established, virtual inductance loop lines. By analyzing the functioning of the virtual inductance loop line system in real time or near-real time, the debugging tool may be used to effectively measure heights of objects that pass across the established virtual inductance loop lines at the scene.

Various exemplary embodiments will be described more fully hereinafter with reference to the accompanying drawings, in which some exemplary embodiments are shown. The present invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention. In the drawings, the sizes and relative sizes of layers and regions may be exaggerated for clarity. Like numerals refer to like elements throughout, and thus repetitive description may be omitted.

When an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

Although the terms "first", "second", etc. may be used herein to describe various elements, components, sections, etc., which should not be limited by these terms. Unless indicated otherwise, these terms are only used to distinguish one element, component, section, etc. from another. Thus, a first element, component, region, or section could be termed a second element, component, region, or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

A "computer" refers to one or more apparatus and/or one or more systems that are capable of accepting a structured input, processing the structured input according to prescribed rules, and producing results of the processing as output. Examples of a computer may include: a stationary and/or portable computer; a computer having a single graphics processing unit, multiple graphics processing units, single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; and an apparatus that may accept data, may process data in accordance with one or more stored software programs, may generate results, and typically may include input, output, storage, arithmetic, logic, and control units.

"Software" refers to prescribed rules to operate a computer. Examples of software may include: software; code segments; instructions; applets; pre-compiled code; compiled code; interpreted code; computer programs; and programmed logic.

A "computer-readable medium" refers to any storage device used for storing data accessible by a computer. Examples of a computer-readable medium may include: a magnetic hard disk; a solid state drive; a floppy disk; an optical disk, such as a CD-ROM and a DVD; a magnetic tape; a flash removable memory; a memory chip; and/or other types of media that can store machine-readable instructions thereon.

A "computer system" refers to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" refers to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, Ethernet cables, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

Although a few embodiments have been described, those skilled in the art will readily appreciate that many modifications are possible without departing from the novel teachings and advantages. Accordingly, all such modifications are intended to be included within the scope of this inventive concept as defined in the claims.

What is claimed is the inventive devices, systems and methods described herein:

1. A computer-implemented method, comprising:
   obtaining, by each of two or more cameras directed towards a scene, an image corresponding to the scene;
   determining, by one or more processors and for each of the images corresponding to the scene, a virtual inductance loop (VIL) line to be imposed on each of the images;
   comparing, by the one or more processors, the VIL lines to determine one or more offsets; and
   determining, by the one or more processors, based on the one or more offsets, one or more characteristics of the scene.

2. The method of claim 1, wherein determining a VIL line to be imposed on each of the images comprises:
   establishing a respective ground level plane at the scene; and
   imposing the VIL line at the respective ground level plane at the scene.

3. The method of claim 1, wherein obtaining, by each of the two or more cameras directed towards the scene, the image corresponding to the scene comprises synchronizing the images obtained by the two or more cameras.

4. The method of claim 1, wherein determining one or more characteristics of the scene comprises determining a change in light intensity of the VIL lines, a change in color of the VIL lines, a predetermined length of a particular intensity of the VIL lines, or a predetermined length of a particular color along the VIL lines.

5. The method of claim 1, comprising:
determining, based on the one or more characteristics of the scene, that an object has passed over the VIL line in a particular direction;
in response to determining that the object has passed over the VIL line, performing an action.

6. The method of claim 5, wherein performing an action comprises triggering one or more of a mechanical computational process, an audible computational process, a visual computational process, or a subsequent computational process.

7. The method of claim 1, wherein determining a VIL line to be imposed on each of the images comprises:
for each image:
identifying one or more identifiers at the scene;
determining a location for each of the one or more identifiers at the scene; and
generating the VIL line at the scene with respect to the locations of the one or more identifiers at the scene.

8. The method of claim 1, wherein determining a VIL line to be imposed on each of the images comprises projecting, for each of the two or more cameras, the VIL line onto an image plane for each of the images corresponding to the scene.

9. The method of claim 1, comprising:
generating one or more cross sectional outlines of an object that correspond to one or more intersections between the object and the VIL lines; and
determining, based on the one or more cross sectional outlines, whether the object has passed over the VIL line.

10. The method of claim 9, wherein generating the one or more cross sectional outlines of the object comprises:
calculating, based on the one or more offsets, a height for each of the one or more characteristics; and
generating, based on the calculated heights for the one or more characteristics, the one or more cross sectional outlines of the object.

11. The method of claim 9, wherein determining whether the object has passed over the VIL line comprises:
determining, using the one or more cross sectional outlines of the object, a size of the object; and
based on determining the size of the object, identifying the object.

12. The method of claim 9, wherein determining whether the object has passed over the VIL line comprises determining, using the one or more cross sectional outlines of the object, one or more of a direction of motion of the object, whether the object is being tailgated, or whether the object is an oversized object.

13. A system, comprising:
two or more cameras directed towards a scene;
one or more processors in communication with the two or more cameras; and
one or more storage devices storing instructions that are operable, when executed by the one or more processors, to cause the one or more processors to perform operations comprising:
obtaining, by each of the two or more cameras, an image corresponding to the scene;
determining a virtual inductance loop (VIL) line to be imposed on each of the images;
comparing the VIL lines to determine one or more offsets; and
determining, based on the one or more offsets, one or more characteristics of the scene.

14. The system of claim 13, wherein the operations of determining a VIL line to be imposed on each of the images comprises:
establishing a respective ground level plane at the scene; and
imposing the VIL line at the respective ground level plane at the scene.

15. The system of claim 13, wherein the operations of obtaining, by each of the two or more cameras directed towards the scene, the image corresponding to the scene comprises synchronizing the images obtained by the two or more cameras.

16. The system of claim 13, wherein the operations of determining one or more characteristics of the scene comprises determining a change in light intensity of the VIL lines, a change in color of the VIL lines, a predetermined length of a particular intensity of the VIL lines, or a predetermined length of a particular color along the VIL lines.

17. The system of claim 13, wherein the operations comprise:
determining, based on the one or more characteristics of the scene, that an object has passed over the VIL line in a particular direction;
in response to determining that the object has passed over the VIL line, performing an action.

18. A non-transitory computer-readable medium storing software comprising instructions executable by one or more computers which, upon such execution, cause the one or more computers to perform operations comprising:
obtaining, by each of two or more cameras directed towards a scene, an image corresponding to the scene;
determining a virtual inductance loop (VIL) line to be imposed on each of the images;
comparing the VIL lines to determine one or more offsets; and
determining, based on the one or more offsets, one or more characteristics of the scene.

19. The non-transitory computer-readable medium of claim 18, wherein the operations of determining a VIL line to be imposed on each of the images comprises:
establishing a respective ground level plane at the scene; and
imposing the VIL line at the respective ground level plane at the scene.

20. The non-transitory computer-readable medium of claim 18, wherein the operations of obtaining, by each of the two or more cameras directed towards the scene, the image corresponding to the scene comprises synchronizing the images obtained by the two or more cameras.

* * * * *